US011250491B2

(12) United States Patent
Noplos

(10) Patent No.: US 11,250,491 B2
(45) Date of Patent: Feb. 15, 2022

(54) SYSTEMS AND METHODS FOR MANAGEMENT OF AUTOMOTIVE SERVICES

(71) Applicant: iService Auto Inc., Beverly Hills, CA (US)

(72) Inventor: Tandon A. Noplos, Beverly Hills, CA (US)

(73) Assignee: iService Auto Inc., Beverly Hills, CA (US)

( * ) Notice: Subject to any disclaimer, the term of this patent is extended or adjusted under 35 U.S.C. 154(b) by 14 days.

(21) Appl. No.: 16/510,566

(22) Filed: Jul. 12, 2019

(65) Prior Publication Data

US 2020/0034909 A1 Jan. 30, 2020

Related U.S. Application Data

(60) Provisional application No. 62/702,601, filed on Jul. 24, 2018.

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *G06Q 10/00* | (2012.01) | |
| *G06Q 20/24* | (2012.01) | |
| *G06Q 20/10* | (2012.01) | |

(52) U.S. Cl.
CPC ......... *G06Q 30/0631* (2013.01); *G06Q 10/20* (2013.01); *G06Q 20/10* (2013.01); *G06Q 20/24* (2013.01); *G06Q 30/0278* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 6,732,028 B2 | 5/2004 | Vanstory et al. | |
| 8,443,301 B1* | 5/2013 | Easterly | G06Q 50/30 715/848 |
| 2002/0073012 A1 | 6/2002 | Lowell et al. | |
| 2002/0169640 A1* | 11/2002 | Freeland | G06Q 50/188 705/4 |
| 2009/0062978 A1* | 3/2009 | Picard | G07C 5/008 701/31.4 |

(Continued)

*Primary Examiner* — Mila Airapetian
(74) *Attorney, Agent, or Firm* — Wolf, Greenfield & Sacks, P.C.

(57) ABSTRACT

An automotive service system and associated methods for facilitating communication between an automotive service shop and its customers are described. According to some aspects, the automotive service system may send a customer access to an inspection video including a demonstration in which one or more components of the customer's vehicle are shown and a recommendation for an automotive service involving the one or more components is given. In some embodiments, the automotive service system may include various modules that provide different functions to the customer, such as allowing a customer to: self-diagnose issues with the vehicle, book an appointment at an automotive repair shop, receive service recommendations and quotes, receive financing options, and/or receive appraisal options.

18 Claims, 23 Drawing Sheets

(56) References Cited

U.S. PATENT DOCUMENTS

| | | | |
|---|---|---|---|
| 2009/0313035 A1* | 12/2009 | Esser | G06Q 30/0601 |
| | | | 705/1.1 |
| 2010/0004007 A1 | 1/2010 | Vogel et al. | |
| 2010/0057860 A1* | 3/2010 | Fry | H04L 67/36 |
| | | | 709/206 |
| 2013/0218761 A1* | 8/2013 | Kwasny | G06Q 10/02 |
| | | | 705/39 |
| 2013/0297352 A1 | 11/2013 | Noe et al. | |
| 2014/0019280 A1 | 1/2014 | Medeiros et al. | |
| 2015/0227880 A1 | 8/2015 | Pierrelouis | |
| 2016/0027071 A1* | 1/2016 | Krutchik | G06Q 30/0278 |
| | | | 705/306 |
| 2017/0308864 A1 | 10/2017 | Kelley | |
| 2018/0025391 A1* | 1/2018 | Funkhouser | G06Q 30/0278 |
| | | | 705/26.4 |
| 2018/0101775 A1* | 4/2018 | Fish | G06Q 10/0631 |
| 2018/0268480 A1* | 9/2018 | Cox | G06Q 30/0641 |

* cited by examiner

SYSTEMS AND METHODS FOR MANAGEMENT OF AUTOMOTIVE SERVICES

CROSS REFERENCE TO RELATED APPLICATION

This application claims the benefit of U.S. Provisional Application No. 62/702,601, filed Jul. 24, 2018, which is hereby incorporated by reference in its entirety.

BACKGROUND

When a customer's vehicle requires repair or other services, the customer will typically bring the vehicle into an automotive service shop such as an automotive repair shop. Repair shops will often have a service advisor who interacts with the customer directly, as well as a technician who works to repair or otherwise service the vehicles. The service advisor typically serves as a liaison between the technician and the customer, and will often provide the customer with information including the recommended services for the customer's vehicle, cost estimates, timing estimates, the status of the work, and so on. In smaller shops, the technician may interact directly with the customer instead of having a service advisor as a liaison.

SUMMARY

According to some aspects, a computer-implemented method of providing automotive repair services to a customer is provided. The method includes sending a customer access to a video including a demonstration in which one or more components of the customer's vehicle are shown and a recommendation for an automotive service involving the one or more components is given. The method also includes sending the customer a recommended automotive service and a cost estimate for the recommended automotive service. The method also includes receiving approval of the recommended automotive service from the customer.

According to some aspects, a computer system is provided. The computer system includes a server computer including one or more processors that are configured to: send a customer access to a video including a demonstration in which one or more components of the customer's vehicle are shown and a recommendation for an automotive service involving the one or more components is given, send the customer a recommended automotive service and a cost estimate for the recommended automotive service, and receive approval of the recommended automotive service from the customer.

According to some aspects, a computer-implemented method of providing automotive repair services to a customer is provided. The method includes sending a customer a recommended automotive service and a cost estimate for the recommended automotive service. The method also includes sending the customer a financing option for the recommended automotive service. The method also includes receiving approval of the financing option from the customer.

According to some aspects, a computer system is provided. The computer system includes a server computer including one or more processors that are configured to: send a customer a recommended automotive service and a cost estimate for the recommended automotive service, send the customer a financing option for the recommended automotive service, and receive approval of the financing option from the customer.

According to some aspects, a computer-implemented method of providing automotive repair services to a customer is provided. The computer-implemented method includes sending a customer a recommended automotive service and a cost estimate for the recommended automotive service. The method also includes sending the customer an offer to appraise the customer's vehicle. The method also includes receiving an acceptance of the offer by the customer. The method also includes notifying a sales department of the acceptance of the offer.

According to some aspects, a computer system is provided. The computer system includes a server computer including one or more processors that are configured to: send a customer a recommended automotive service and a cost estimate for the recommended automotive service, send the customer an offer to appraise the customer's vehicle, receive an acceptance of the offer by the customer, and notify a sales department of the acceptance of the offer.

According to some aspects, a computer-implemented method of providing automotive repair services to a customer is provided. The computer-implemented method include sending a customer a vehicle self-diagnosis process comprising a plurality of questions relating to characteristics of the customer's vehicle to identify an issue with the customer's vehicle. The method also includes receiving answers to the plurality of questions from the customer. The method also includes sending the customer an identification of the one or more issues with the customer's vehicle based on the answers from the customer.

According to some aspects, a computer system is provided. The computer system includes a server computer including one or more processors that are configured to: send a customer a vehicle self-diagnosis process comprising a plurality of questions relating to characteristics of the customer's vehicle to identify an issue with the customer's vehicle, receive answers to the plurality of questions from the customer, and, based on the answers from the customer, send the customer an identification of the one or more issues with the customer's vehicle.

According to some aspects, a computer-implemented method of providing automotive repair services to a customer is provided. The computer-implemented method includes sending a request for quotes for an automotive service to a plurality of automotive repair shops. The method also includes receiving, from each of the plurality of automotive repair shops, a quote for the automotive service. The method also includes sending each of the quotes to the customer. The method also includes receiving approval of one of the quotes from the customer.

According to some aspects, a computer system is provided. The computer system includes a server computer including one or more processors that are configured to: send a request for quotes for an automotive service to a plurality of automotive repair shops, receive, from each of the plurality of automotive repair shops, a quote for the automotive service, send each of the quotes to the customer, and receive approval of one of the quotes from the customer.

In at least some aspects of the invention, data regarding customer interaction and response with the repair service system, as well as technician or other service provider interaction and response with the repair service system, may be tracked and analyzed, e.g., to enhance or otherwise adjust system operation. For example, data regarding time for a customer to review and/or respond to a recommended service video or other information may be tracked, as well as whether the customer approved all or some of the recommended service and price paid may be assessed. This information may allow the service system operator to revise system operation to improve the user experience, improve sales, adjust messaging in recommended service videos or other information, and/or other operation within the system. Since data for a wide variety of customers and with respect to a variety of different vehicles, geographical locations, recommended repair items, etc. may be collected, stored and assessed, the service system may provide a strong return on value for a system operator since the operator may be enabled to tailor system operation to not only vehicle types, repair types, geographic regions, etc., but also for individual or groups of customers. For example, data analysis may show that customers are more likely to repair their vehicles in a recommended way, and to be willing to pay more, if the customer responds with an approval/decline/question within a certain amount of time after viewing a recommended service video. A system operator may use this information to remind a customer to respond to the recommended service items after some period of time after the customer views the video. Other data analysis and system operation adjustment will be appreciated in view of the description below.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

The inventors have appreciated that communicating effectively with customers and increasing sales can be a challenge for automotive service shops, such as automotive repair shops. There can be a disconnect between customers and the automotive repair shop regarding the timing and/or cost needed for a repair or maintenance recommended by the service advisor at the repair shop. Effective communication with customers can be challenging including: reaching the customer in a timely manner, being available and accessible to the customer for questions, providing the customer increasing value and trust, and providing the customer a full understanding of the recommendations that are needed for the vehicle.

Conventionally, when the customer is not physically present at the service shop, communication between the service shop and the customer is typically by phone. The inventors have appreciated that phone communication can be inconvenient for customers, particularly while at work or on the go. The inventors have appreciated that many customers prefer to communicate through a web-based modality rather than speaking by phone.

The inventors have thus recognized the need for a system that will improve communication between automotive service shops and their customers.

Described herein are methods and systems for facilitating communication between automotive service shops and customers.

According to one aspect, an automotive service network may include multiple parties and permit communication between such parties. Examples of parties include, but are not limited to: a server of an automotive service system, an automotive service shop, and a customer. In some embodiments, additional parties are included in the network. For example, the network may additionally communicate with one or any combination of the following parties: sales, appraisals, financing, and the customer's bank for payment.

As used herein, a "customer" may be a user of an automotive service network who is seeking services for their vehicle. It should be appreciated that the term "customer" does not require an actual exchange of money or performance of services for a user to be a customer. The customer may or may not pay to use the automotive service system.

Figure 1:
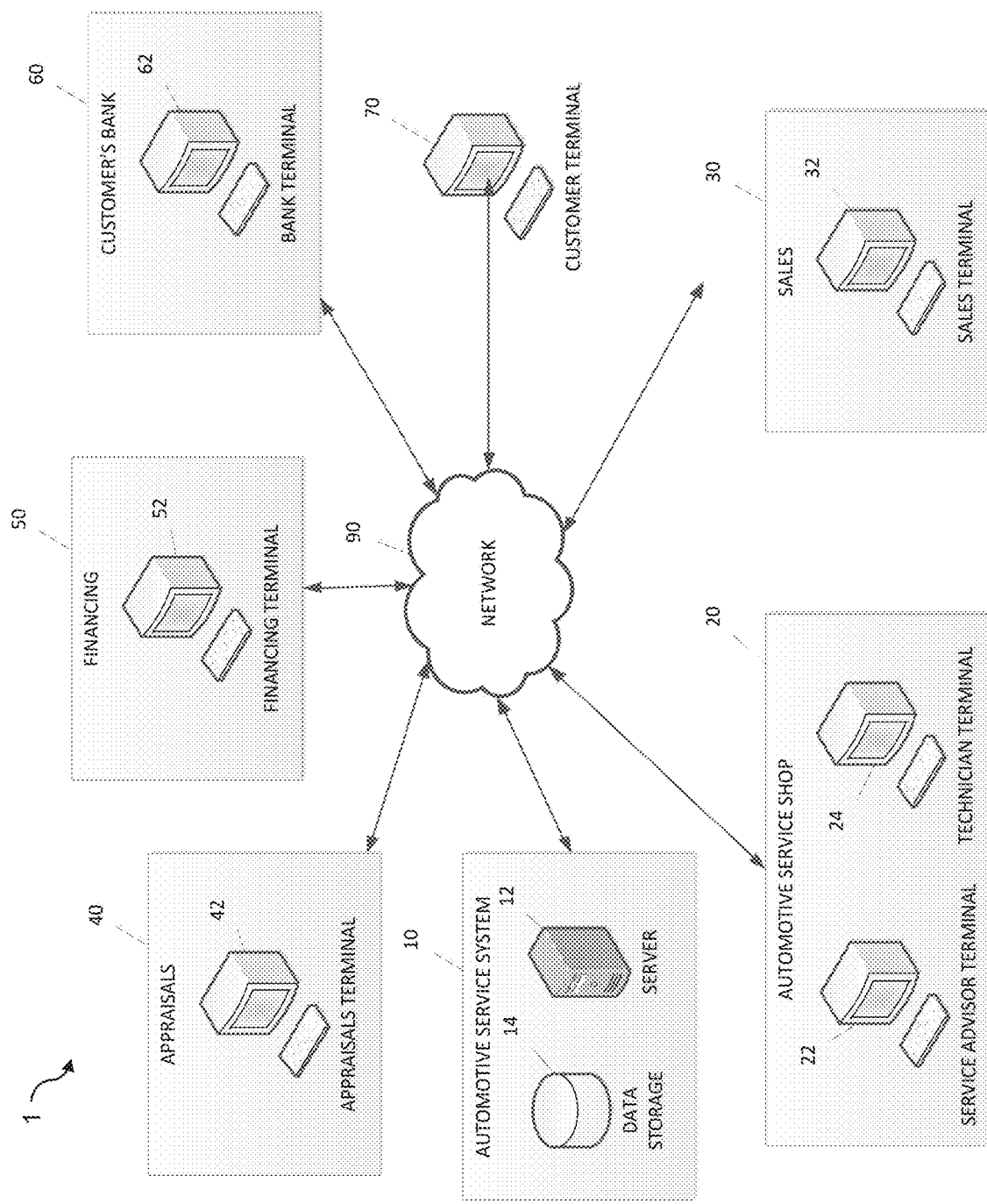
FIG. 1 is a schematic diagram of an automotive service network, including an automotive service system.

One illustrative embodiment of an automotive service network 1 is shown in FIG. 1. In this illustrative embodiment, the automotive service network 1 includes an automotive service system 10 configured to communicate with various parties across a data communication network 90. In some embodiments, the various parties may communicate directly with one another, or may communicate with one another via the automotive service system 10 as a go-between.

The automotive service system 10 may comprise a server 12 and a data storage 14. The server 12 may include one or more processors configured to perform the methods of the automotive service system. For example, the server may perform methods of facilitating communication between the various parties, including communication between the customer and the automotive service shop.

In some embodiments, the automotive service system may include a computer-executable application that runs on the terminals of any of the parties involved. For example, the customer and/or the automotive repair shops may participate in the automotive service network by interacting with an application running on their respective terminals. Examples of terminals include, but are not limited to: desktop computers, PCs, Macs, laptop computers, tablet computers, smartphones, PDAs, smartwatches, or any other computing device that is capable of connecting to the data communication network 90. The application of the automotive service system may be a web-based application (e.g. an application that is run in a browser), a desktop application (e.g. an application that is run locally at a terminal, such as software installed on a computer, or smartphone applications such as iOS or Android apps), or any other suitable computer-executable application.

As shown in FIG. 1, the automotive service network 1 may include a plurality of parties communicating over the data communication network 90, or may include only one entity that includes one or more of the components in FIG. 1, such as a car dealership that includes service, appraisal, sales, etc. components as well as a terminal usable by customers for interacting with the system. In some embodiments, in addition to the automotive service system 10, the automotive service network 1 may include one or any combination of the following: one or more automotive service shops 20, one or more customers with customer terminals 70, sales 30, appraisals 40, financing 50, and one or more banks 60. One or more of these parties may be combined into a single entity. For example, an automotive service shop may also include one or more of: sales, appraisal and financing. Financing and the customer's bank may be the same financial institution.

Each of these parties may have a terminal to communicate over the data communication network 90. For example, the automotive service shop 20 may include a service advisor terminal 22 and a technician terminal 24. As an illustrative example, the technician terminal may be a separate terminal from the service advisor terminal. As such, a service advisor can operate the service advisor terminal in the customer-facing portion of the service shop, while the technician may operate the technician terminal in the garage portion of the service shop. In automotive service shops that merge the service advisor role and technician role into a single role, the automotive service shop may have only one terminal.

As seen in FIG. 1, the customer has a customer terminal 70, sales 30 may have a sales terminal 32, appraisals may have an appraisal terminal 42, financing may have a financing terminal 52, and the customer's bank may have a bank terminal 62.

It should be appreciated that one or more of the parties identified in FIG. 1 can be combined into a single party. For example, automotive service shops may provide appraisal services, and thus a separate appraisal company may not be involved in the automotive service network 1.

Features of the automotive service system will now be discussed.

According to one aspect, an automotive service system may include one or more modules, each providing various options that can be selected by a user (e.g. a customer or a service advisor/technician). The automotive service system may use any combination of the modules described herein. As such, it should be appreciated that some of the modules discussed herein are purely optional, and that some embodiments of the automotive service system may not include all modules.

Figure 2:
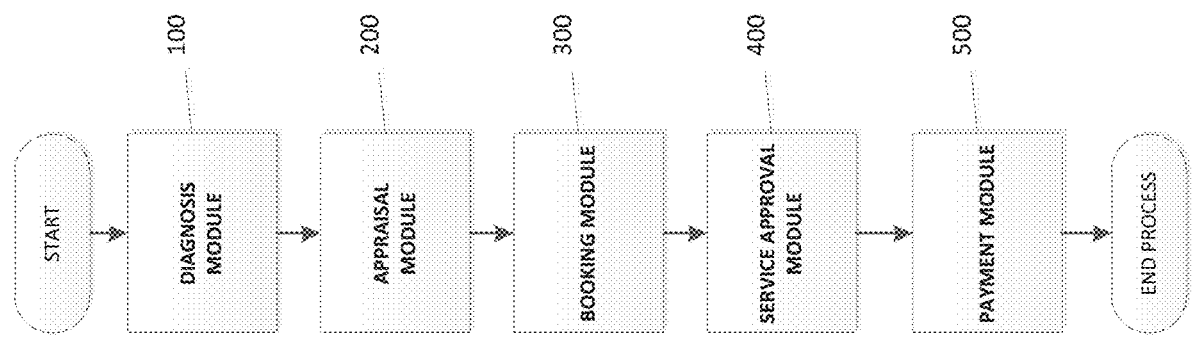
FIG. 2 is a schematic diagram of architecture of an illustrative embodiment of an automotive service system.

A schematic diagram of architecture of an illustrative embodiment of an automotive service system is shown in FIG. 2. The system includes a diagnosis module 100, an appraisal module 200, a booking module 300, a service approval module 400, and a payment module. In some embodiments, a diagnosis module may generally assist a customer in performing a self-diagnosis of the customer's vehicle to determine one or more potential issues with the vehicle. In some embodiments, a booking module may generally assist the customer with booking an appointment with an automotive service shop to address one or more desired automotive services. In some embodiments, a service approval module may generally facilitate communication between an automotive service shop and a customer to obtain customer approval of one or more services recommended by the automotive service shop. In some embodiments, a payment module may generally assist with obtaining payment from the customer. Each module will be discussed in greater detail below.

In some embodiments, the automotive service system may be configured such that one or more modules may be activated or deactivated. In some embodiments, the modules are activated and deactivated by a user (e.g. a customer or a service advisor/technician at an automotive service shop). In some embodiments, a customer may set various preferences when using the automotive service system which may cause various modules to activate or deactivate. As an illustrative example, the automotive service system may ask the customer if he/she is interested in an appraisal. If the customer answers yes, then the appraisal module is activated and the steps within the appraisal module are carried out. In some embodiments, the appraisal module may be activated by a customer making a selection, for example, by pressing a button on a screen. In one illustrative example, the automotive service system is embodied in an application that a customer can interact with. The application may display a menu of options, one of which includes an "appraise my car" button. If the customer selects the button, the appraisal module is activated. In some embodiments, pressing the "appraise my car" button will take the customer directly into the appraisal module and run through the steps of the appraisal module.

In some embodiments, the modules are activated and deactivated by an administrator of the automotive service system. There may be different versions of the automotive service system with different modules activated and deactivated depending on the desired purposes for using the automotive service system. For example, an automotive service shop may want to implement the automotive service system as a feature of convenience for their customers. However, the automotive service shop may not be interested in offering all modules to their customers. For example, an automotive service shop may not be interested in permitting customers to run through a self-diagnosis process, and would instead prefer the customer to bring the vehicle in and letting a technician handle the diagnosis directly. An administrator of the automotive service system may deactivate the diagnosis module or any other module of the automotive service system. In some embodiments, the administrator of the automotive service system is the automotive service shop itself. However, in other embodiments, the administrator of the automotive service system is a different party than the automotive service shop. The administrator of the automotive service system may have be able to control certain settings of the automotive service system that the automotive service shop does not have access to, such as certain modules. The automotive service shop may request that the administrator of the automotive service system activate or deactivate certain modules to best suit the automotive service shop's preferences.

In some embodiments, the automotive service system is configured to run through some or all modules in a sequence. If a module is deactivated, the system will not run through the module, and will instead skip to the next module in sequence. For example, in the illustrative embodiment shown in FIG. 3, the automotive service system begins with a check of the status of the diagnosis module 100. If the diagnosis module is active, the automotive service system will run through the diagnosis module 100, and then proceed to a check of the status of the appraisal module. If the diagnosis module is not active, the automotive service system will skip the diagnosis module and go directly to a check of the status of the appraisal module. If the appraisal module is active, the automotive service system will run through the appraisal module 200, and then proceed to a check of the status of the booking module. If the appraisal module is not active, the automotive service system will skip the appraisal module and go directly to a check of the status of the booking module. If the booking module is active, the automotive service system will run through the booking module 300, and then proceed to the service approval module. If the booking module is not active, the automotive service system will skip the booking module and go directly to the service approval module. Then, after running through the service approval module, the automotive service system will proceed to the payment module, and then end the process. In the embodiment shown in FIG. 3, the service approval module and the payment modules are required modules, and all other modules can be activated or deactivated. In other embodiments, however, any combination of required modules may be used. For example, in some embodiments, the diagnosis module and/or the booking module are required alternatively or in addition to the service approval module and the payment module. In some embodiments, the payment module can be deactivated. In some embodiments, the automotive service system does not include one or more of the modules at all such that there is no check of whether or not such modules are activated or not. For example, some automotive service systems do not include a diagnosis module, an appraisal module, a booking module, or a payment module, or any combination of these modules.

Figure 3:
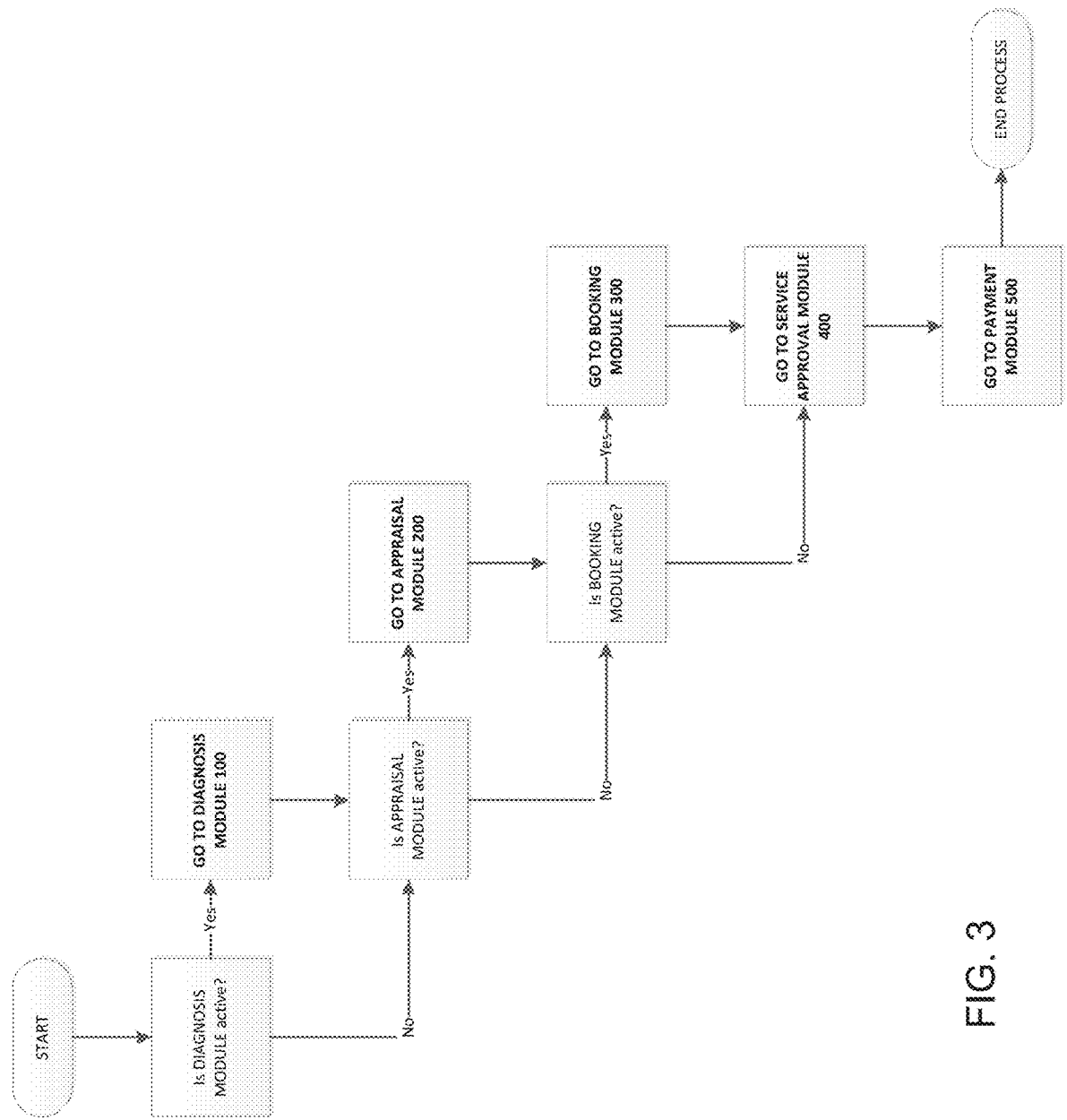
FIG. 3 is a schematic diagram of architecture of an illustrative embodiment of an automotive service system.

It should also be appreciated that the order of the sequence of modules shown in FIG. 3 is not the only possible order of modules. For example, in some embodiments, the appraisal module may come after the booking module. In some embodiments, a customer may go back to a previous module to, for example, change previously entered information or previously made selections. In some embodiments, a customer may jump between modules, in any direction, without needing to go through them in sequence. For example, a customer may skip over certain modules, with an option to return to them later.

The illustrative embodiment of FIG. 3 shows an automotive service system that runs through each of the modules sequentially. However, in other embodiments, one or more of the modules may not fit into an overall sequence, but rather may be called upon by a customer at any time. As such, the way in which the user (e.g. a customer or a service advisor/technician) interacts with the automotive service system will determine the actual sequence of when the modules will be executed rather than having a preset sequence each time.

In some embodiments, the modules are not in a set sequence, and instead a customer can select which module to execute at what time. In some embodiments, the automotive service system is a mixture of a set sequence of modules along with modules that can be called upon at any time or at certain times to allow the user to jump out of a module to run through a different module. For example, in some embodiments, the payment module automatically follows the service approval module, but the rest of the modules can occur at any time. In addition, in some embodiments, the automotive service system enters the payment module only after the customer has approved one or more recommended automotive services in the service approval module. As such, the service approval module and payment module may be in a set sequence. However, other modules that permit users to choose various options may not be in a set sequence. For example, the appraisal module may, in some embodiments, be accessible by a customer at any time. In one illustrative embodiment, a customer activates the appraisal module by pressing a button on a screen of an application embodying the automotive service system. As an example, the button may be an "Appraise my Car" button. Such a button may be available to the customer at every screen of the application of the automotive service system. For example, the "Appraise my Car" button may remain on the screen on the application while the customer is working through the diagnosis module, the booking module, the service approval module, and/or the payment module. If this customer is working through a module and presses the "Appraise my Car" button while working through the module, the automotive service system may exit the current module and move directly to the appraisal module. As such, in some embodiments, a customer may, while working through a first module, exit the first module and enter a second module. Doing so may interrupt the first module and cause the automotive service system to move directly to the second module. In some embodiments, the automotive service system will store all information already inputted or exchanged in the first module so that the customer can return to the first module without needing to re-input information. In some embodiments, after the customer has worked through the second module, the customer can choose to return to the previous module that was interrupted and start back at the same place in the first module where the customer had been at the time of interruption. In some embodiments, when the customer has finished the second module, the automotive service system will automatically bring the customer back to the first module, and in some cases, to the location in the module that the customer was last at.

In some embodiments, the automotive service system may automatically enter a module based on different triggers, such as a timer, a user action, or due to a pre-defined sequence. In some embodiments, when the automotive service system enters a module or engages in some action, the automotive service system may include a timer for that module and/or action. If the timer times out, the automotive service system may automatically take an action, such as sending a reminder, exiting the module to a start menu, moving automatically to a different module, and so on. In some embodiments, a user action and/or selection may dictate whether the automotive service system enters into certain modules automatically. For example, in some embodiments, a customer may set preferences that are remembered by the automotive service system. As an illustrative example, a customer may indicate whether they are or are not interested in financing or appraisal. If the customer indicates interest, these modules may be automatically entered as the customer interacts with the automotive service system. In some embodiments, as discussed previously, completion of one module may cause the automotive service system to automatically enter another module. For example, completion of a service approval module and, in some embodiments, approval of at least one service, may cause the automotive service system to automatically enter a payment module.

Figure 4:
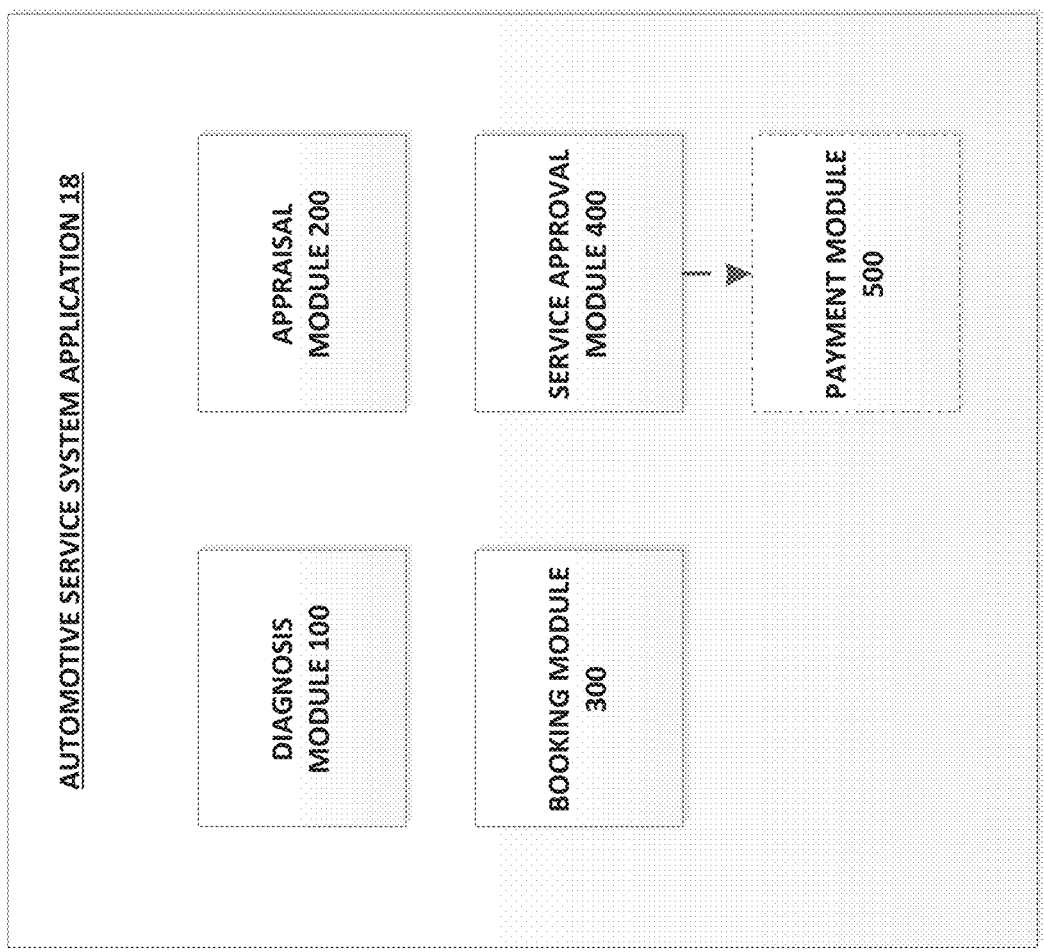
FIG. 4 is a schematic diagram of architecture of an illustrative embodiment of an application of an automotive service system.

One illustrative embodiment of an automotive service system in which modules can be called up by a customer in any order is shown in FIG. 4. The customer interacts with the automotive service system via an application 18, which can be, for example, a web-based application that is run in a browser, or a desktop application that is run locally. The application 18 may include one or more screens with buttons that a customer can select to enter a certain module. In the illustrative embodiment shown in FIG. 4, the application 18 has buttons for entering the diagnosis module, the booking module, the appraisal module, and the service approval module. In some embodiments, entering one module will engage a sequence of modules. For example, the payment module 500 is shown in FIG. 4 with dotted lines to signify that a customer cannot select the payment module from the application screen, but rather the application will automatically take the customer to the payment module after completing the service approval module. In other embodiments, however, the customer can select the payment module from the application screen. And, in some embodiments, the application will also automatically take the customer to the payment module after completing the service approval module.

It should be appreciated that, in some embodiments, one or more of the modules shown in FIG. 4 may be omitted from an automotive service system. In some embodiments, an automotive service system may contain only one or any combination of the following modules: a diagnosis module, an appraisal module, a booking module, a service approval module, or a payment module. In some embodiments, an automotive service system contains only one of: a diagnosis module, a booking module, an appraisal module, or a service approval module. In some embodiments, the automotive service system contains only a service approval module and a payment module.

Each of the modules will now be discussed in detail.

Diagnosis Module

According to one aspect, an automotive service system may include a diagnosis module that assists a customer in performing a self-diagnosis of the customer's vehicle to determine one or more potential issues with the vehicle. The diagnosis module may ask the customer a series of questions and make a determination as to the likely issue or issues with the customer's vehicle based on the customer's answers. The diagnosis module may also present proposed automotive service(s) to address the vehicle issue(s). In some embodiments, the diagnosis module includes images and/or videos to help the customer locate and identify various vehicle components needed to perform the diagnosis. In some embodiments, the diagnosis module may provide basic troubleshooting walkthroughs and/or tips to assist the customer in resolving basic issues that may not require technician assistance. In some embodiments, the diagnosis module may prompt the customer to take images or video of certain vehicle components. The images/video may be sent to one or more automotive technicians to help with diagnosis of the issue(s). In some embodiments, the image recognition software may help to identify the components in the images/video and/or to help identify the potential issue with the vehicle. In some embodiments, the diagnosis module initiates two-way communication between the customer and a technician, e.g. via a phone call, text messaging, or video conferencing. The technician may walk the customer through an inspection of the vehicle in real time and make a diagnosis. For example, the customer may, using a video-capable device such as a smartphone with an integrated camera, show a technician during a video call the issues that the customer is experiencing with his/her vehicle.

In some embodiments, the automotive service system may include predictive capabilities configured to inform a customer when it is time to replace or repair a part before an issue with the vehicle actually occurs. For example, in some embodiments, the automotive service system may communicate with self-diagnostic components embedded into a customer's vehicle. Such components may monitor various indicators, such as mileage, brake time, temperature of environment and other weather information, or any other suitable indicators. In one illustrative embodiment, an automotive service system communicating with self-diagnostic components embedded in a customer's vehicle may signal to the customer when it is time to repair or replace a part, such as, for example, change the tires or brakes. Alternatively or in addition, in some embodiments, the automotive service system may send such diagnostic information to an automotive service shop.

Figure 5:
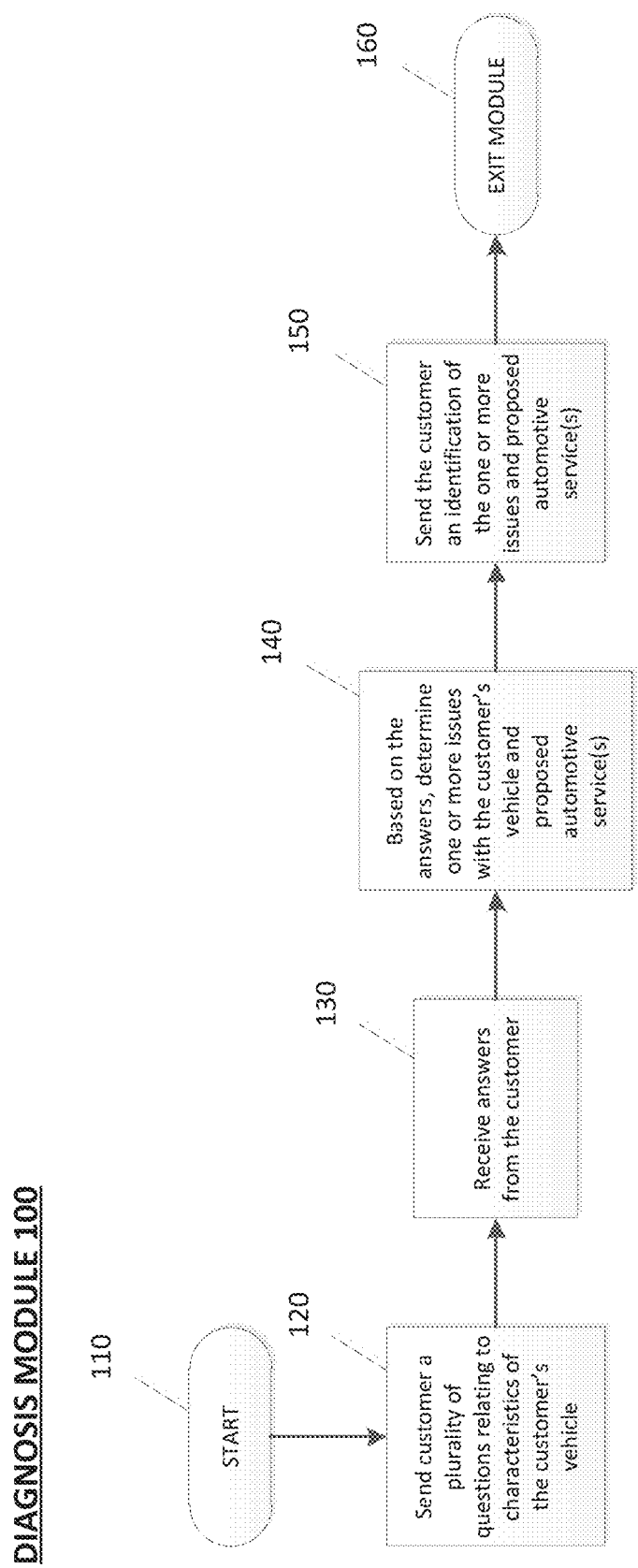
FIG. 5 is a schematic diagram of an illustrative embodiment of a diagnosis module.

An illustrative embodiment of a diagnosis module is shown in FIG. 5, beginning at start 110. In some embodiments, the automotive service system may enter diagnosis module 100 due to a customer selecting a button in an application, such as a "Self-Diagnose" button. Within the diagnosis module 100, in step 120, the automotive service system may send a customer a plurality of questions relating to characteristics of the customer's vehicle. Then, in step 130, the automotive service system may receive answers from the customer. Such answers may include sound and/or video recordings of the automobile during operation or while not operating, such as photos or videos of various vehicle parts. The automotive service system may ask more questions based on the customer's answers, e.g., request video of a particular vehicle part while the engine is running. The questions and answers may be sent in real time, e.g., a live technician may correspond with a customer during a chat or other communication session, or may be sent in a more time delayed manner, e.g., at the customer's convenience. Next, in step 140, based on the customer's answers, the automotive service system may determine one or more issues with the customer's vehicle and determine proposed automotive service(s). Then, in step 150, the automotive service system may send the customer a list of the determined issue(s) and/or proposed automotive service(s). In some embodiments, this list of issues and services is stored by the automotive service system in data storage to be accessed by other modules and/or to populate a summary report. The automotive service system then exits the diagnosis module in step 160. After exiting, the automotive service system may return to a menu of options where the customer can choose which module to enter next, such as that shown in FIG. 4, or may proceed directly to another module, such as the process shown in FIGS. 1 and 2. In some embodiments, after exiting the diagnosis module, the automotive service system takes the customer directly to a booking module, to an appraisal module or to a financing option within a payment module.

Appraisal Module

According to one aspect, an automotive service system may include an appraisal module to assist the customer with obtaining an appraisal of the customer's vehicle. In some embodiments, the appraisal module redirects the customer to third party appraisal websites. The automotive service system may send the customer to "preferred" appraisal websites. "Preferred" appraisal websites may have a sponsorship arrangement with the automotive service system administrator and/or the automotive service shop implementing the automotive service system. In some embodiments, the appraisal module allows the customer to book an appointment with an appraiser. In some cases, the automotive service shop that provides the customer with quotes for proposed vehicle services may also offer appraisal services. In some embodiments, the appraisal module provides the customer with a guided process that walks the customer through an appraisal. In some embodiments, the appraisal module may connect the customer with an appraiser via, e.g., phone, text messaging, and/or video chatting, and the appraiser can provide live advice to the customer regarding an appraisal. In some embodiments, the appraisal module may include an option for the customer to decide to sell their car rather than repair it. In some embodiments, choosing such an option may cause the automotive service system to bypass other modules, such as the service approval module 400 and the payment module 500. In some embodiments, when a customer indicates an interest in appraising their car, such as by clicking on an "Appraise my Car" button, the automotive service system notifies one or more sales groups that the customer may be interested in selling their car. The sales group may be part of an automotive service shop, a dealership, or may be a different entity. In some embodiments, the automotive service system tracks when the customer enters the appraisal module and time stamps it.

Figure 6:
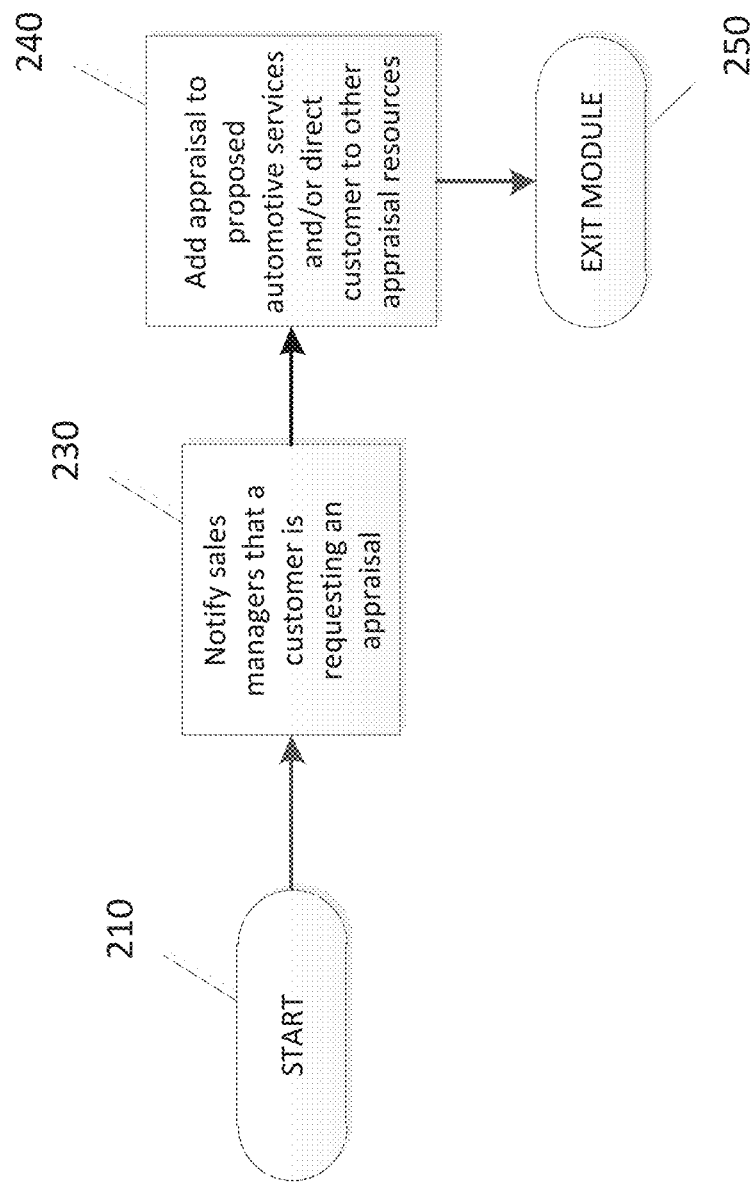
FIG. 6 is a schematic diagram of an illustrative embodiment of an appraisal module.

An illustrative embodiment of an appraisal module is shown in FIG. 6, beginning at start 210. In some embodiments, the automotive service system may enter appraisal module 200 due to a customer selecting a button in an application, such as an "Appraise my Car" button. Within the appraisal module 200, in step 230, the automotive service system notifies sales managers that a customer is requesting an appraisal. In some embodiments, the sales managers may be part of an automotive service shop that is also trying to sell the customer repair services. In some embodiments, the sales managers are or include third party appraisers. Next, in step 240, the automotive service system may add appraisal to a list of proposed automotive services, and/or the automotive service system may direct the customer to other appraisal resources, and/or an appraisal may be performed (e.g., by one or more personnel in a dealership) and the appraisal information provided to the customer (e.g., the estimated sales price along with a description of the basis for the appraisal may be provided). In some embodiments, the customer can carry out an appraisal evaluation within the module itself, e.g., by referring to a database of average sales prices for vehicles generally matching the year, model, condition, etc. of the customer's vehicle. Finally, the automotive service system exits the module in step 250.

Booking Module

According to one aspect, an automotive service system may include a booking module that assists a customer with booking an appointment with an automotive service shop. The customer can book an appointment entirely through the booking module without needing to call or otherwise contact the automotive service shop.

In some embodiments, the booking module has access and maintains a calendar of appointments for the automotive service shop. In some embodiments, the customer has the option to permit the automotive service system to access the customer's own calendar to aid in identifying mutual availability.

In some embodiments, the booking module helps customers book an appointment to address one or more specific automotive services. The services may have been identified by using the diagnosis module. Alternatively or in addition, the customer may specify desired services without use of the diagnosis module. The booking module may provide the customer with an estimate for the desired services. In some embodiments, the booking module may provide a plurality of options of automotive service shops to the customer, including associated information such as availability, cost estimates, reviews, distance, etc. The booking module may allow the customer to filter automotive service shops by any of this information, e.g., including by schedule, distance, reviews, cost, etc. In some embodiments, the booking module may allow customers to book appointments directly with specific technicians at an automotive service shop, rather than the shop as a whole. The booking module may provide information about the technicians, such as relevant certifications, number of years of experience, customer reviews such as ratings and testimonials, etc.

In some embodiments, the booking module includes an auction-type feature where multiple automotive service shops may bid for the customer's business. For example, the automotive service system may receive the customer's desired automotive services and alert multiple automotive service shops, who submit bids for the service. The automotive service system may present the bids to the customer and the customer may choose an automotive service shop to make an appointment with.

In some embodiments, the booking module may have one or more "preferred" automotive service shops. In some embodiments, the status of being a "preferred" automotive service shop may be affected by the customer's preferences and/or history. Alternatively or in addition, in some embodiments, the status of being a "preferred" automotive service shop may be dictated by sponsorship fees paid by an automotive service shop to an administrator of the automotive service system.

Figure 7:
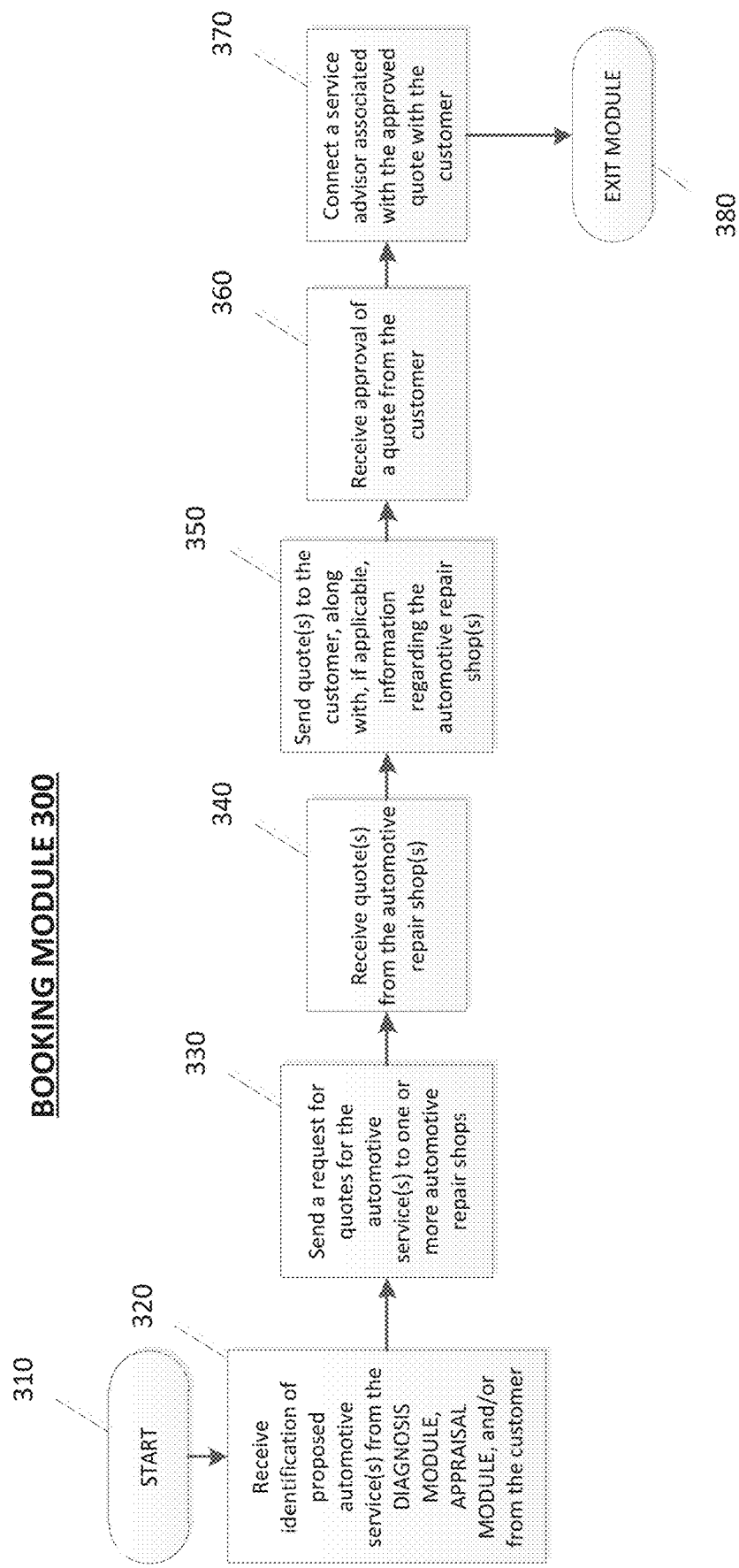
FIG. 7 is a schematic diagram of an illustrative embodiment of a booking module.

An illustrative embodiment of a booking module is shown in FIG. 7, beginning at start 310. In some embodiments, the automotive service system may enter booking module 300 due to a customer selecting a button in an application, such as a "Book Appointment" button. In some embodiments, the automotive service system may automatically enter the booking module after completing a diagnosis module.

Within the booking module 300, in step 320, the automotive service system may receive identification of proposed automotive service(s) from the diagnosis module, the appraisal module, the service approval module and/or from the customer directly. In some embodiments, the proposed automotive service(s) identified from the diagnosis module and/or the appraisal module is stored in the data storage of the automotive service system, and is accessed by the booking module 300. In some embodiments, if appraisal is not desired by the customer, or if the customer obtained or plans to obtain an appraisal via a different manner than with the automotive service shop, the appraisal service will not be added to the list of proposed automotive services.

Next, in step 330, the automotive service system may send a request for quotes for the proposed automotive service(s) to one or more automotive repair shop. In step 340, the automotive service system receives quote(s) from the automotive repair shop(s). Next, in step 350, the automotive service system sends the quote(s) to the customer, along with, if applicable, information relating to the automotive repair shop(s), such as distance, availability, reviews, etc. Next, in step 360, the automotive service system receives approval of one of the quotes from the customer. Of course, in some embodiments the customer may have the option to exit a booking module process, e.g., if the quoted prices exceed what the customer is willing to pay for the recommended service items. In step 370, the automotive service system may connect a service advisor of the automotive service shop associated with an approved quote with the customer, and exits the module in step 380.

Service Approval Module

According to one aspect, an automotive service system may include a service approval module that assists a customer with communicating with an automotive service shop to approve or decline service recommendations from the automotive service shop.

According to one aspect, some embodiments described herein are directed to sending a customer access to a video including a demonstration in which one or more components of the customer's vehicle are shown and a recommendation for an automotive service involving the one or more components is given. The inventors have recognized that, providing customers with an ability to actually see in a video the components that require servicing help customers to better understand the service shop's service recommendations and may lead to customers being more likely to approve the shop's recommendations and/or pay their bill. In some embodiments, such a feature may be captured within a service approval module.

In some embodiments, a service approval module may generally facilitate communication between an automotive service shop and a customer regarding, for example: the identified issue(s) with the customer's vehicle, the service shop's recommended service(s) and associated quote(s), and the customer's approval or non-approval of the recommended service(s). In some embodiments, the service approval module facilitates sending the customer access to a video that includes a demonstration in which one or more components of the customer's vehicle are shown and a recommendation for an automotive service involving the one or more components is given.

In some embodiments, after reviewing the video, the customer receives a listing of one or more recommended automotive services and a cost estimate for the recommended services, and the customer can approve or decline one or more of the services. Or the customer could refer to the booking module to receive additional quotes for the recommended service items and have the service performed by an entity other than the one providing the service recommendations. In such a case, the entity providing the service recommendations may receive compensation, such as a referral fee payable by the shop that performs the recommended service or operator of the service system.

In some embodiments, the automotive service system aggregates all services that were recommended but not approved by the customer into one or more reports. The system may aggregate data from just a single customer, from multiple customers at an automotive service shop, or across multiple automotive service shops. The automotive service system may send the reports to an automotive service shop. In some embodiments, the reports may include the dollar amount and type of service that was recommended but not approved. The reports may be filterable to provide different types of information. For example, a reader of the report may filter the information in the report by customer-specific information (e.g. customer age, zip code), type of vehicle (e.g. luxury vs. standard), by shop location (e.g. if the automotive service shop is a chain with multiple locations), service advisor name, technician name, or by any other suitable category. Such reports may be used by automotive service shops to, for example, create targeted marketing and improve the effectiveness of promotional campaigns. With automotive service shops having multiple locations, such reports may, for example, help to identify which locations are most effective at selling which services.

In some embodiments, if a technician makes a determination that an issue with the vehicle is occurring due to a part that has failed or needs repair, the automotive service system may log this information. The automotive service system may also tie the technician's inspection video showing the failed part into the log. In some embodiments, the automotive service system may provide such part failure information and, in some cases, the associated video, to interested parties such as automobile manufacturers or insurers. In one illustrative embodiment, an automotive service system tags all parts that a technician reports as being damaged, worn, or otherwise in need of repair. In some embodiments, a GPS transmitter, RFID tag, or other device may be used to tag such parts. Tracking such information may allow the automotive service system to make correlations between accidents and unrepaired or worn parts. The automotive service system can, in some embodiments, track whether or not certain parts were ever repaired/replaced, when the services were done, which shop completed the services, and/or which technician completed the services.

Figure 8:
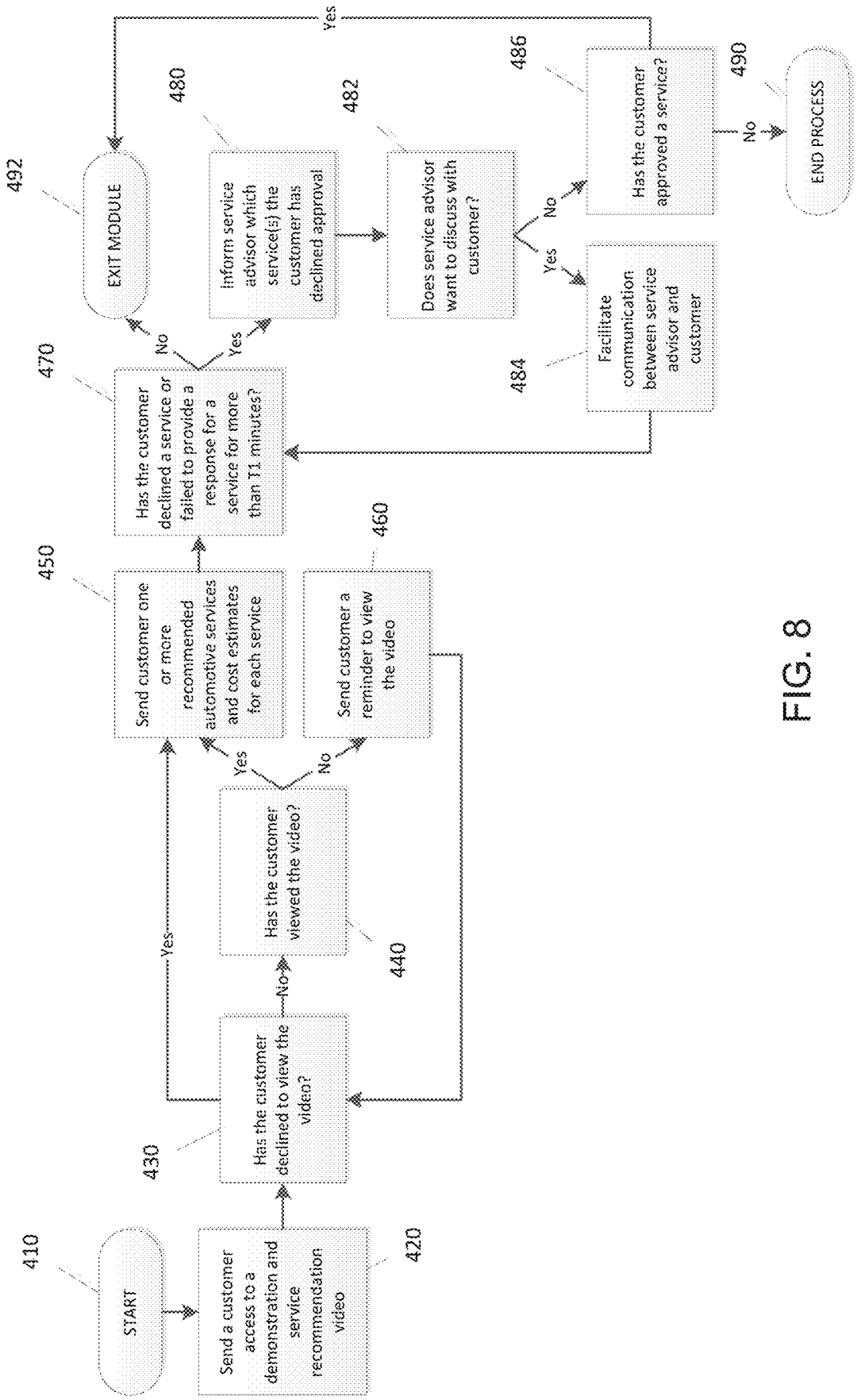
FIG. 8 is a schematic diagram of an illustrative embodiment of a service approval module.

An illustrative embodiment of a service approval module is shown in FIG. 8, beginning at start 410. In some embodiments, the automotive service system may enter the service approval module 400 due to a customer selecting a button in an application, such as a "Review/Approve Services" button. In some embodiments, the customer may be sent an e-mail or text message with a link, and selecting the link may cause the customer's computing device to automatically enter the service approval module. In some embodiments, the automotive service system may automatically enter the service approval module after completing interaction with another module.

Within the service approval module 400, in step 420, the automotive service system sends a customer access to an inspection video in which a technician demonstrates various components of the customer's vehicle that may require service, and provides recommendations on services. Such access may be a link to a video file stored in a remote server or other location that can be activated by the user, an actual video file that can be played at the user's device, or other. In step 430, if the customer has declined to view the video, the automotive service system may move directly to step 450, in which the automotive service system sends the customer one or more recommended automotive services and cost estimates for each service. If the customer has not yet declined to view the video, the automotive service system checks in step 440 if the customer has viewed the video. If the customer has viewed the video, then the automotive service system proceeds to step 450. If the customer has not yet viewed the video, the automotive service system may send the customer a reminder to review the video in step 460.

Proceeding on from step 450 to step 470, the automotive service system checks to see if the customer has declined a service or if the customer has filed to provide a response for a service for more than a set amount of time defined as T1 minutes. The variable T1 can be to any suitable amount of time and can be changed by an administrator of the automotive service system and/or by an automotive service shop. In some embodiments, T1 may be at least 10 minutes, at least 30 minutes, at least 60 minutes, at least 120 minutes, at least 360 minutes, or at least 720 minutes. In some embodiments, T1 may be less than or equal to 1440 minutes, less than or equal to 720 minutes, less than or equal to 360 minutes, less than or equal to 120 minutes, or less than or equal to 60 minutes. Combinations of the above-referenced ranges are also possible. For example, T1 may be about 10 minutes to about 1440 minutes, or about 30 minutes to about 720 minutes, or about 60 minutes to about 360 minutes, or about 60 minutes to about 120 minutes.

If the customer has either declined a service or failed to provide a response within T1 minutes, the automotive service system in step 480 informs the service advisor that a service has been declined by the customer. Next, in step 482, the automotive service system determines whether the service advisor wishes to discuss with the customer to try to persuade the customer to approve the declined service(s). If the service advisor wishes to discuss with the customer, the automotive service system can, in step 484, facilitate communication between the service advisor and the customer. The module then returns to step 470 to check if any services have been declined or if no response has been received within T1 minutes. If, however, the service advisor does not wish to discuss with the customer, the automotive service system moves from step 482 to step 486, where the module checks whether or not any services have been approved. If no services have been approved, the automotive service system can end the process at 490. If at least one service has been approved, the automotive service system moves instead from step 486 to step 492, where the automotive service system exits the module. In some embodiments, the automotive service system is configured to move automatically from the service approval module 400 to a payment module 500 if at least one service has been approved. In such embodiments, the "exit module" step 492 will take the customer directly to the payment module, whereas the "end process" step 490 will not take the customer to the payment module and will, for example, bring the customer back to a main menu, or exit the application entirely, or refer recommended service items to the booking module which may put the service items out for quote by one or more other repair shops. On the automotive service shop side, "end process" step 490 may cause the automotive service system to close out of the customer's repair order and move it to an archive.

In some embodiments, however, the exit module step 492 and the end process step 490 both bring the customer back to a main menu, such as the screen shown in FIG. 4, and thus there may be no difference in result between the two steps.

Returning back to step 470, if the customer has not declined any services and has not failed to provide any responses, the automotive service system exits the module in step 492.

Payment Module

According to one aspect, an automotive service system may include a payment module that assists a customer in paying an automotive service shop for one or more approved services. In some embodiments, a payment module obtains payment from the customer. For example, the payment module may obtain credit card information and authorization from the customer, and/or may offer the customer options for financing the services. In some embodiments, the financing option may be a stand-alone module separate from the payment module rather than combined with the payment module. In such embodiments, the payment module is dedicated to obtaining actual funds from the customer, such as a credit card payment or a wire transfer, while the financing module directs a customer to financing institutions or allows the customer to apply for financing directly through the module.

Figure 9:
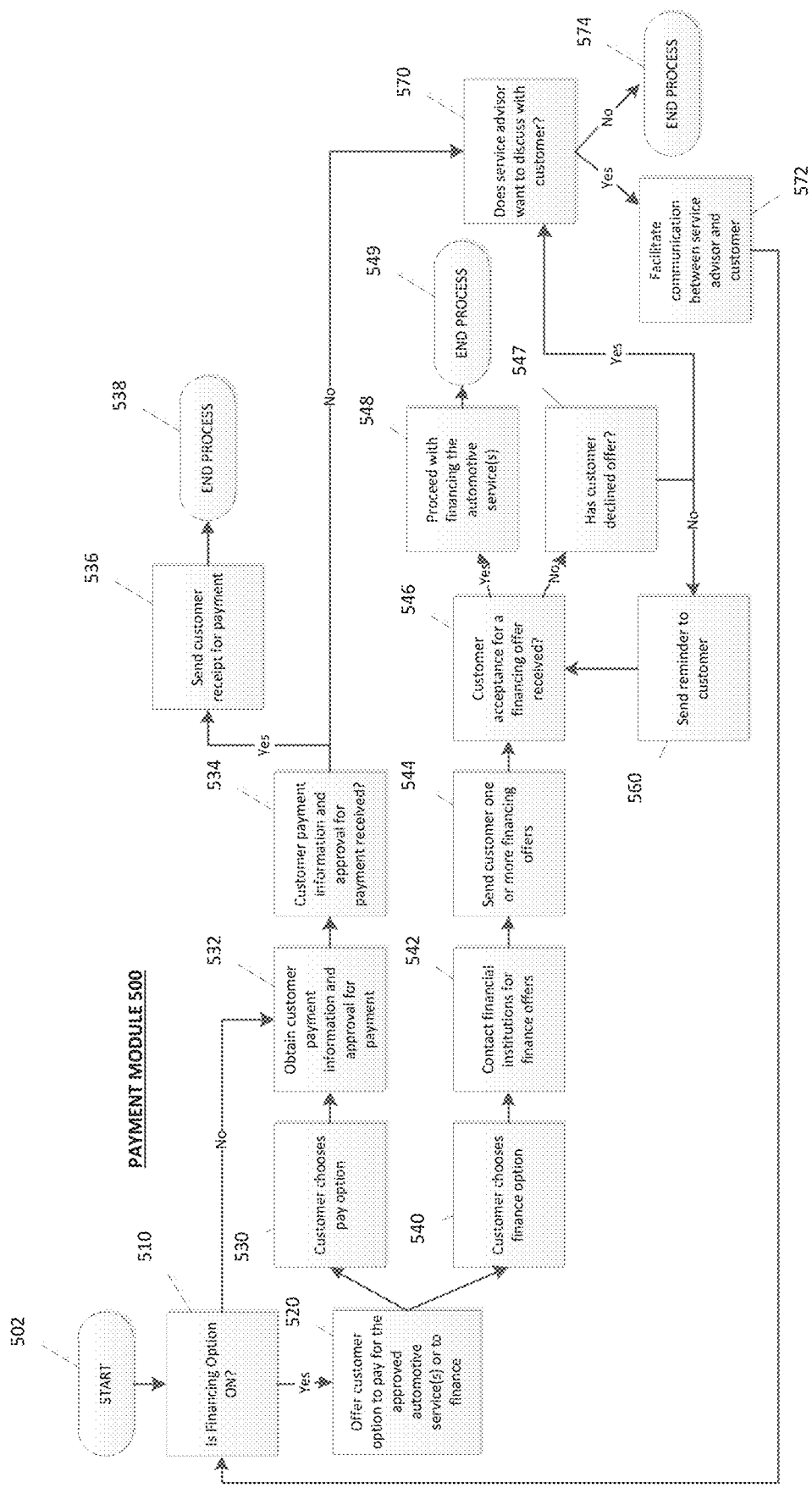
FIG. 9 is a schematic diagram of an illustrative embodiment of a payment module.

An illustrative embodiment of a payment module 500 is shown in FIG. 9, beginning at start 502. In some embodiments, the automotive service system may enter payment module 500 due to a customer selecting a button in an application, such as a "Pay Bill" button. In some embodiments, the automotive service system may enter payment module 500 automatically after the customer has approved at least one service, e.g., in the service approval module 400.

Within the payment module 500, in step 510, the automotive service system determines whether or not a financing option is on. The state of the financing option may be controlled by the administrator of the automotive service system and/or by the automotive service shop. If the financing option is NOT on, the automotive service system proceeds directly to step 532, in which the automotive service system obtains customer payment information and approval for payment. In step 534, the automotive service system checks that the payment information and authorization has been received and is valid. If the payment information and authorization has been received and is valid, the automotive service system proceeds to step 536, and sends the customer a receipt for payment. The automotive service system then ends the process at 538. On the customer side, the automotive service system may return to a main menu. On the automotive service shop side, the automotive service system may close out the customer's repair order and send it to an archive. Returning to step 534, if customer payment information has not been received, is not valid, or the customer has not authorized the payment (e.g. has not signed), the automotive service system may proceed to step 570. In step 570, the automotive service system checks whether or not the service advisor wants to discuss payment with the customer. If not, the automotive service system exits to step 574. If the service advisor does wish to discuss payment with the customer, the automotive service system proceeds to step 572 and facilitates communication between the service advisor and customer. The automotive service system may then move back to step 510 to being the process again. In some embodiments, the automotive service system may remember where the customer left off and return instead to that step rather than restart the process. For example, the automotive service system may return to step 532 and ask for customer payment information.

Returning to step 510, if the financing option is on, the automotive service system may proceed to step 520, in which the automotive service system offers the customer an option to pay for the approved automotive service(s) or to finance the service(s). The customer can choose the pay option in step 530, or instead choose the finance option in step 540. With the pay option in step 530, the automotive service system proceeds to step 532 and enters the process described above.

With the finance option in step 540, the automotive service system may, in step 542, contact one or more financial institutions for finance offers. In some embodiments, the financing may come from the automotive service shop itself, in which case the automotive service system may contact the financing department of the automotive service shop for financing offers. In step 544, the automotive service system may send the customer the financing offers. In step 546, the automotive service system checks to see if the customer has accepted a financing offer. If not, and the customer has not yet declined the offer (step 547), the automotive service system sends a reminder to the customer in step 560. If the customer declines the offer in step 547, the automotive service system is sent to step 570 to verify whether or not the service advisor wishes to discuss payment with the customer, as discussed above.

Returning to step 546, if the customer accepts a financing offer, the automotive service system proceeds to step 548 in which financing of the service(s) occurs. The automotive service system then ends the process at step 549.

In some embodiments, a customer may receive access to a "financing" button at various stages of interaction with the automotive service system. For example, the automotive service system may include a button such as a "financing" button on the same screen as the inspection video (from step 420 in FIG. 8) and/or on the service approval/decline selection list (from step 450 in FIG. 8). A customer may click on the "financing" button to exit from one module and move to step 542 of FIG. 9.

It should be noted that, while financing is shown integrated within the payment module of FIG. 9, in some embodiments, the financing option may be in its own module separated from the payment module. In some embodiments, a financing module may have steps similar to what is shown in FIG. 9, starting with step 540 and moving downstream from step 540, including steps 542, 544, 546, 548, 549, 547, 560, 570, 572, and 574.

Illustrative Embodiment of a Workflow Overview

One illustrative embodiment of a workflow overview of an automotive service system is shown in FIGS. 10-15. This workflow overview may be performed using a service approval module 400 and payment module 500 discussed above, at least in part.

Figure 10:
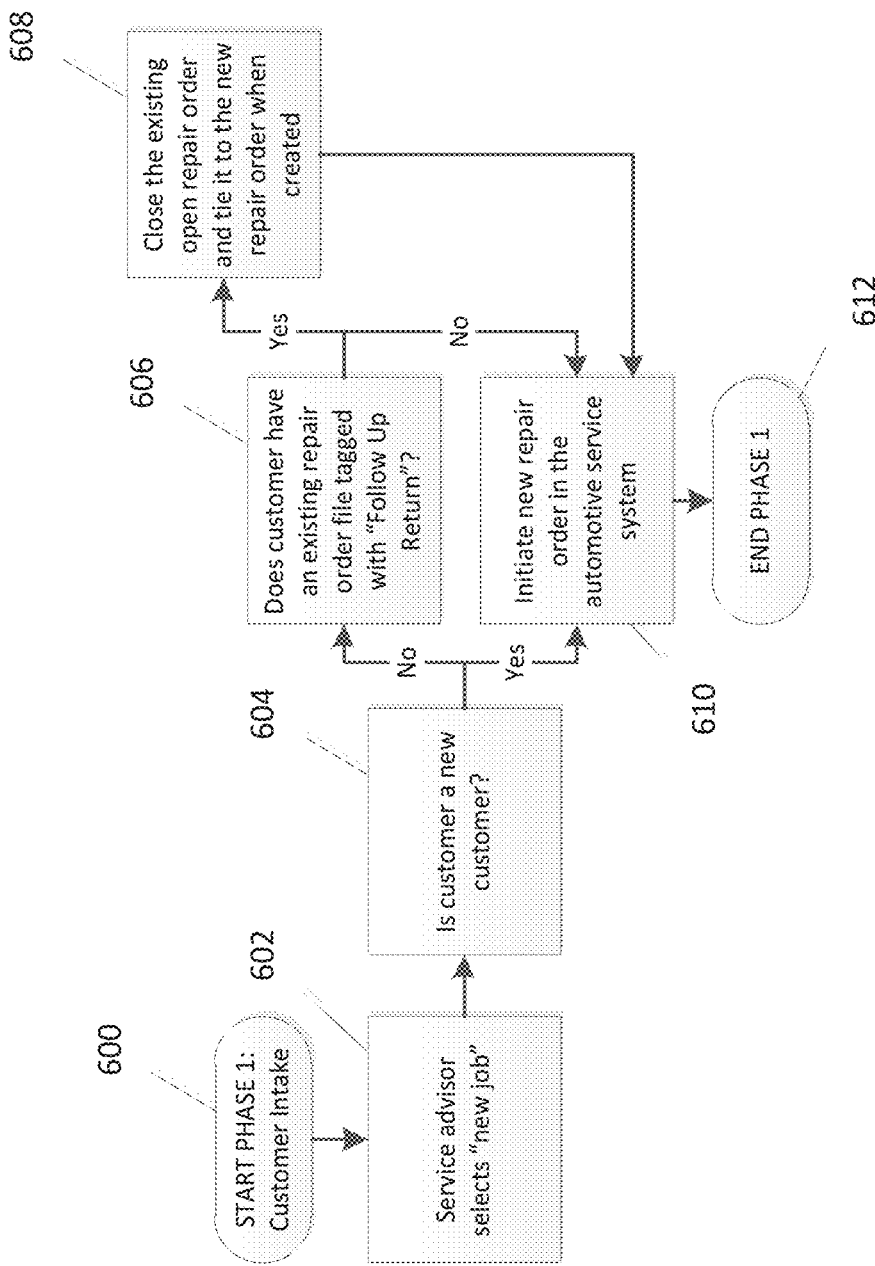
FIG. 10 is a schematic diagram of an illustrative embodiment of a first phase of an automotive service shop interacting with an automotive service system platform.

FIG. 10 is a schematic representation of phase 1 of the workflow, which is a customer intake phase 600. First, in step 602, the service advisor working with an application of the automotive service system opens a new repair order by selecting a button such as a "new job" button. In step 604, the automotive service system checks if the customer is a new customer. If the customer is a new customer, the automotive service system moves to step 610 and initiates a new repair order in the automotive service system, and phase 1 ends at step 612. Returning to step 604, if the customer is a returning customer, the automotive service system moves instead to step 606 and checks to see if the customer has an existing repair order file that is tagged with "Follow Up Return". Such a tag may indicate that the customer had declined services or non-paid services from a previous visit. If the customer does have an existing repair order file that is tagged with "Follow Up Return," the automotive service system moves to step 608 closes the existing open repair order associated with the return customer and ties the information within the existing open repair order to the new repair order when created. From step 608, the automotive service system moves to step 610 to open a new repair order. Returning to step 606, if the customer does not have an existing repair order file that is tagged with "Follow Up Return," the automotive service system moves to step 610 to open a new repair order. Phase 1 has now ended.

Figure 11:
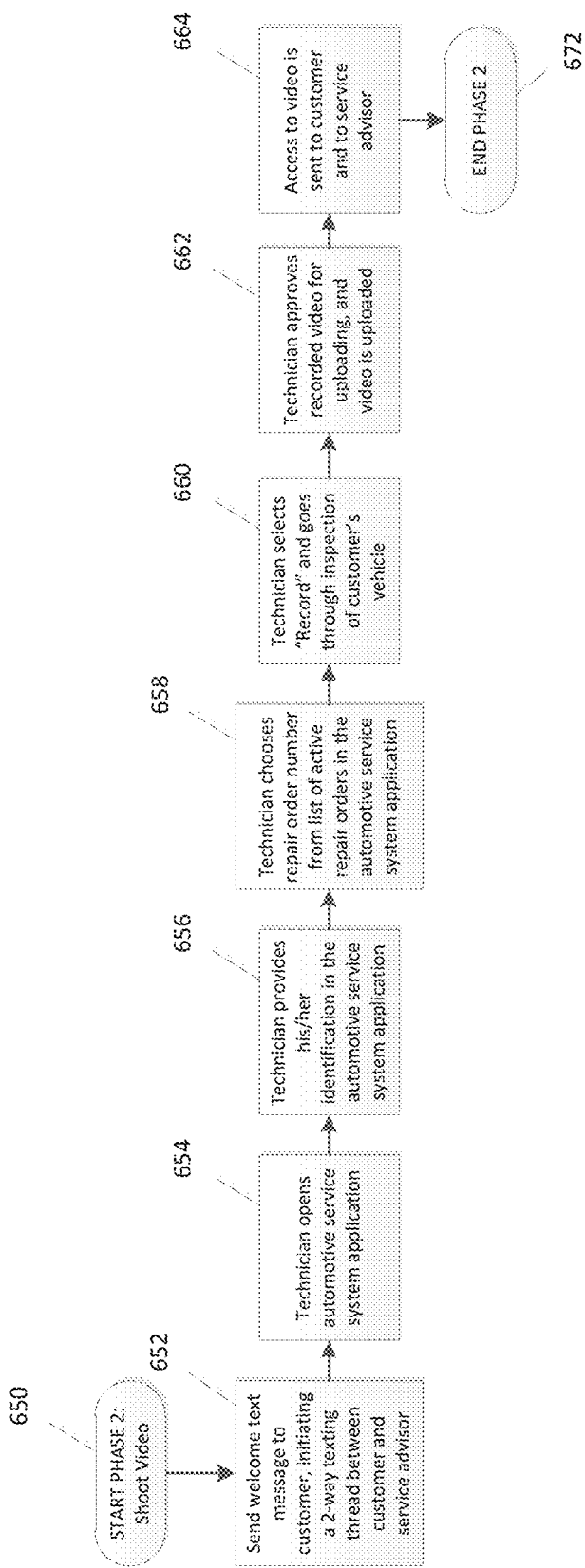
FIG. 11 is a schematic diagram of an illustrative embodiment of a second phase of a customer and an automotive service shop interacting with an automotive service system platform.

The automotive service system then moves on the Phase 2 of the workflow, which is shown schematically in FIG. 11. Phase 2 is a "shoot video" phase 650. First, in step 652, the automotive service system sends a welcome text message to the customer, initiating a two-way texting thread. In some embodiments, on the service advisor side, the texting thread is contained within an application of the automotive service system. In some embodiments, on the customer side, the texting thread is implemented within a third party texting application within the customer's computing device, such as the iMessage application in iOS or its counterpart in Android. The customer may receive the text message in accordance with how the customer typically receives text messages on their computing device, rather than on an application specific to the automotive service system. Next, in step 654, a technician at the automotive service shop opens the technician version of the automotive service system application. In step 656, the technician provides his/her identification in the application. In some embodiments, the technician may select his/her name from a list of technicians. In step 658, the technician then chooses the customer's repair order number from a list of active repair orders in the application. Next, in step 660, while in the automotive service system, the technician selects the "Record" button and goes through the inspection of the customer's vehicle. The technician may interact with the automotive service system via a computing device that is capable of taking video. The computing device may be portable. The technician may capture with the camera various components of the customer's vehicle that require service, and may demonstrate issues with the vehicle. In the video, technician may provide service recommendations for addresses the issue(s) with the vehicle. Next, in step 662, the technician approves the recorded video for uploading, and the video is uploaded. In some embodiments, the video is uploaded to the automotive service system and stored within data storage. In some embodiments, the video is sent to third party program that is embedded within the automotive service system application, e.g. YouTube. Afterwards, in step 664, access to the video is sent to the customer and to the service advisor. Phase 2 then ends at 672.

Figure 12:
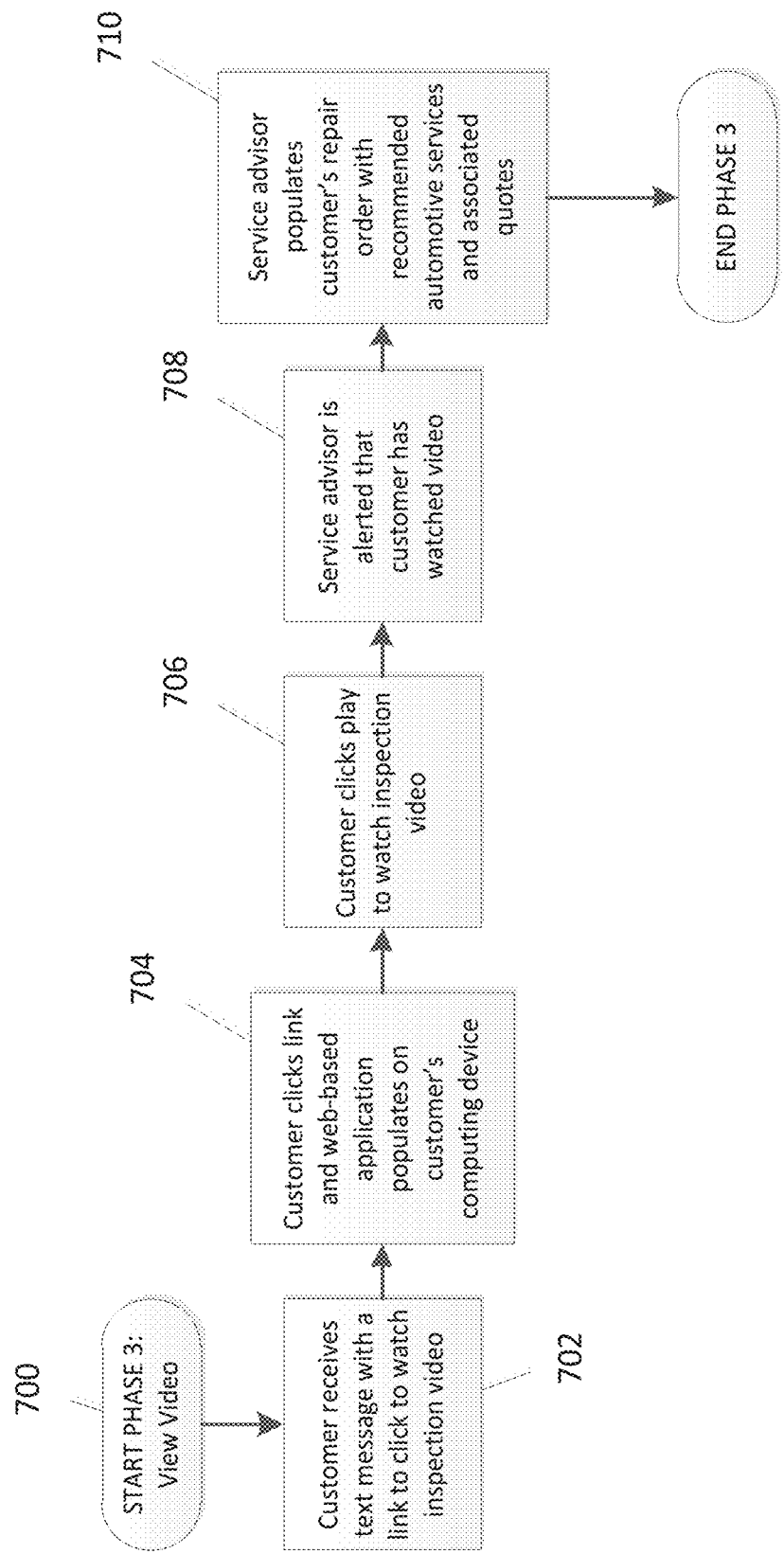
FIG. 12 is a schematic diagram of an illustrative embodiment of a third phase of a customer and an automotive service shop interacting with an automotive service system platform.

The automotive service system proceeds to Phase 3 of the workflow, which is shown schematically in FIG. 12. Phase 3 is a "view video" phase 700. First, in step 702, the customer receives a text message with a link to watch the inspection video. In step 704, the customer clicks on the link, and a web-based application populates on the customer's computing device. Note that, in some embodiments, this application could be a desktop application instead. Next, in step 706, the customer clicks play on the video player within the web-based application to watch the inspection video. Afterwards, in step 708, the service advisor is alerted that the customer has watched the inspection video. Finally, in step 710, the service advisor populates the customer's repair order with recommended automotive services and associated quotes. Phase 3 then ends.

Figure 13:
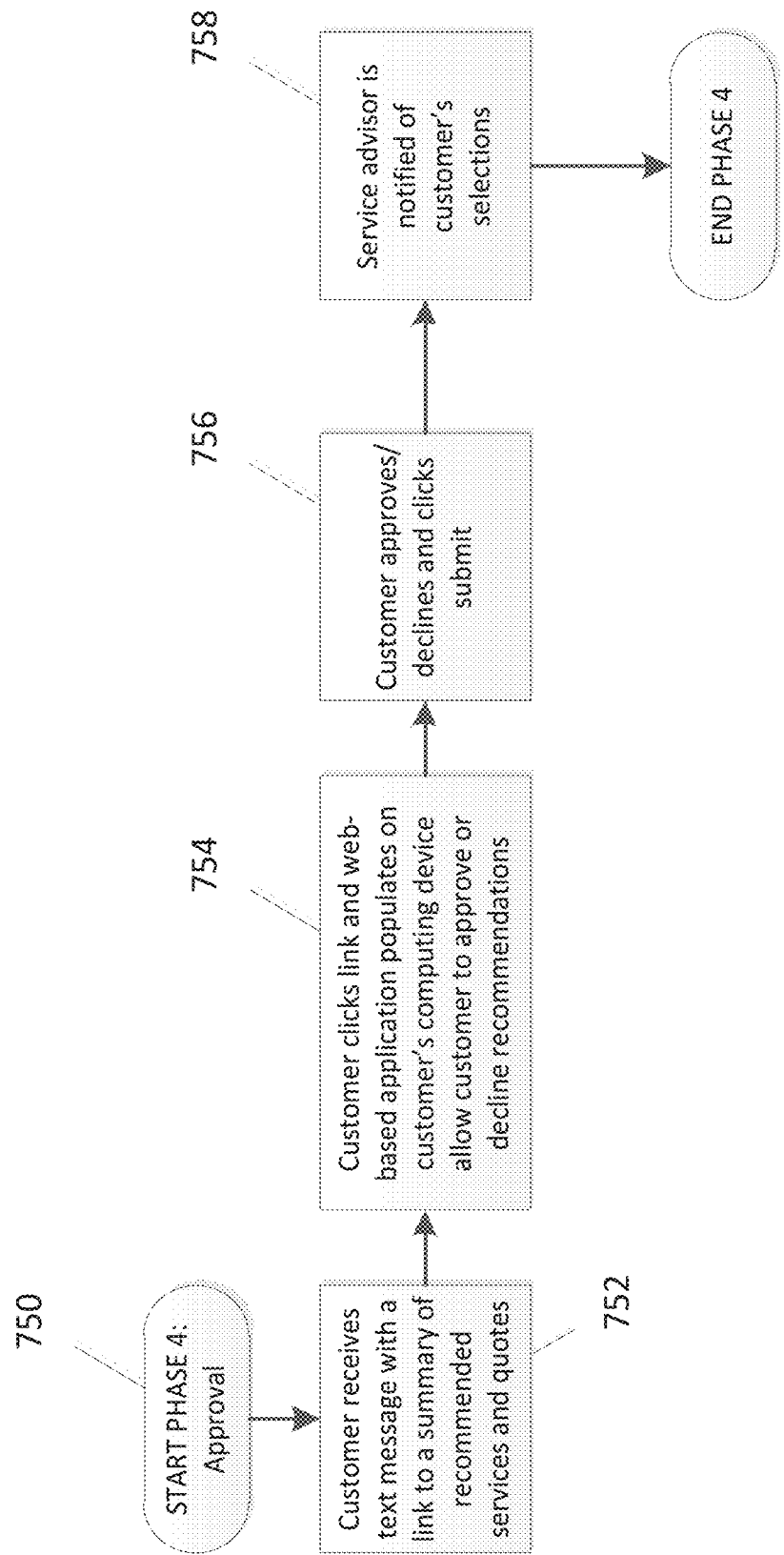
FIG. 13 is a schematic diagram of an illustrative embodiment of a fourth phase of a customer and an automotive service shop interacting with an automotive service system platform.

The automotive service system proceeds to Phase 4 of the workflow, which is shown schematically in FIG. 13. Phase 4 is an "approval" phase 750. First, in step 752, the customer receives a text message with a link to a summary of recommended services and quotes. In step 754, the customer clicks the link and a web-based application populates on the customer's computing device to allow the customer to approve or decline recommendations. In step 756, the customer makes approval/decline selections and submits. Finally, in step 758, the service advisor is notified of the customer's selections. Phase 4 then ends.

Figure 14:
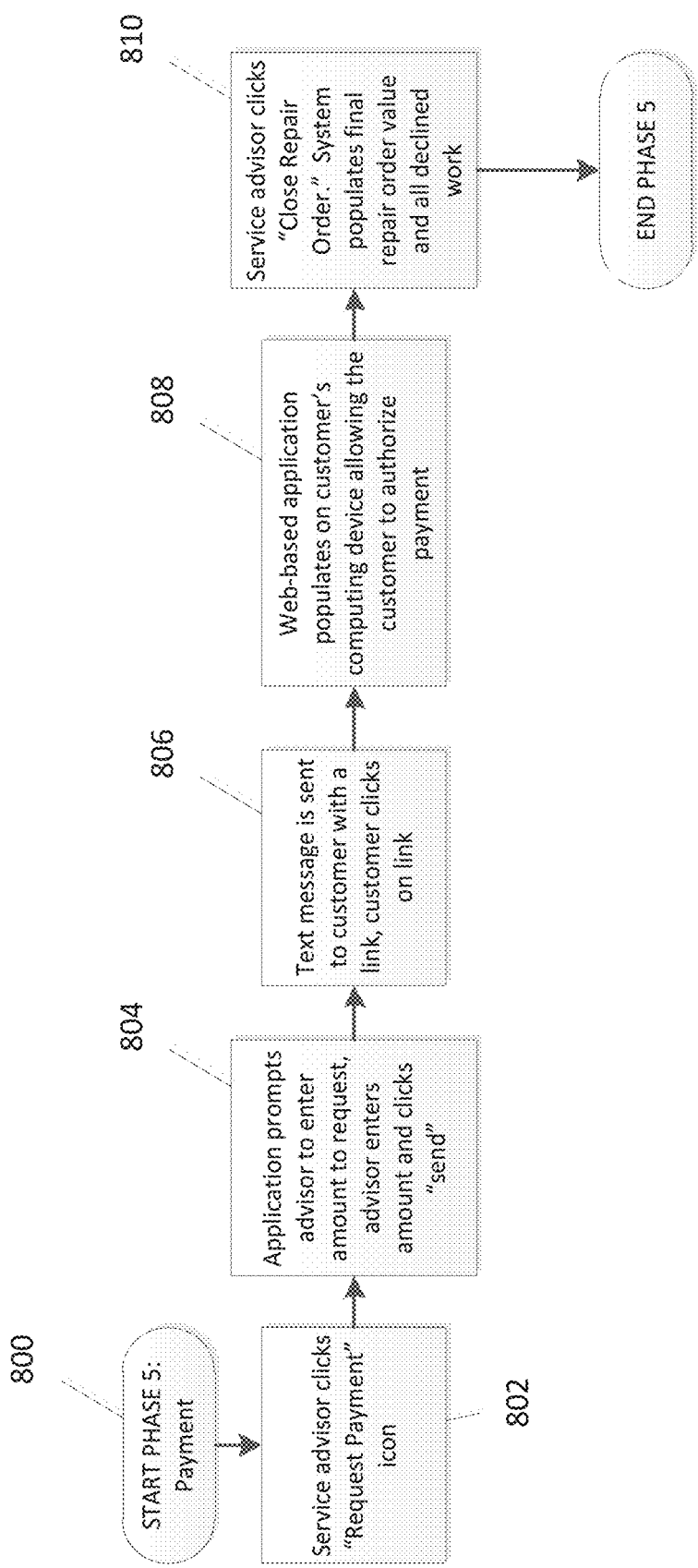
FIG. 14 is a schematic diagram of an illustrative embodiment of a fifth phase of a customer and an automotive service shop interacting with an automotive service system platform.

The automotive service system proceeds to Phase 5 of the workflow, which is shown schematically in FIG. 14. Phase 5 is a "payment" phase 800. First, in step 802, the service advisor clicks a "request payment" icon. Next, in step 804, the application prompts the advisor to enter an amount to request, the advisor enters an amount and clicks "send." Next, in step 806, a text message is sent to the customer with a link, and the customer clicks on the link. In step 808, a web-based application populations on the customer's computing device, allowing the customer to authorize payment. Finally, in step 810, the advisor clicks "close repair order." The automotive service system populates the final repair order value and all declined work. Phase 5 then ends.

Figure 15:
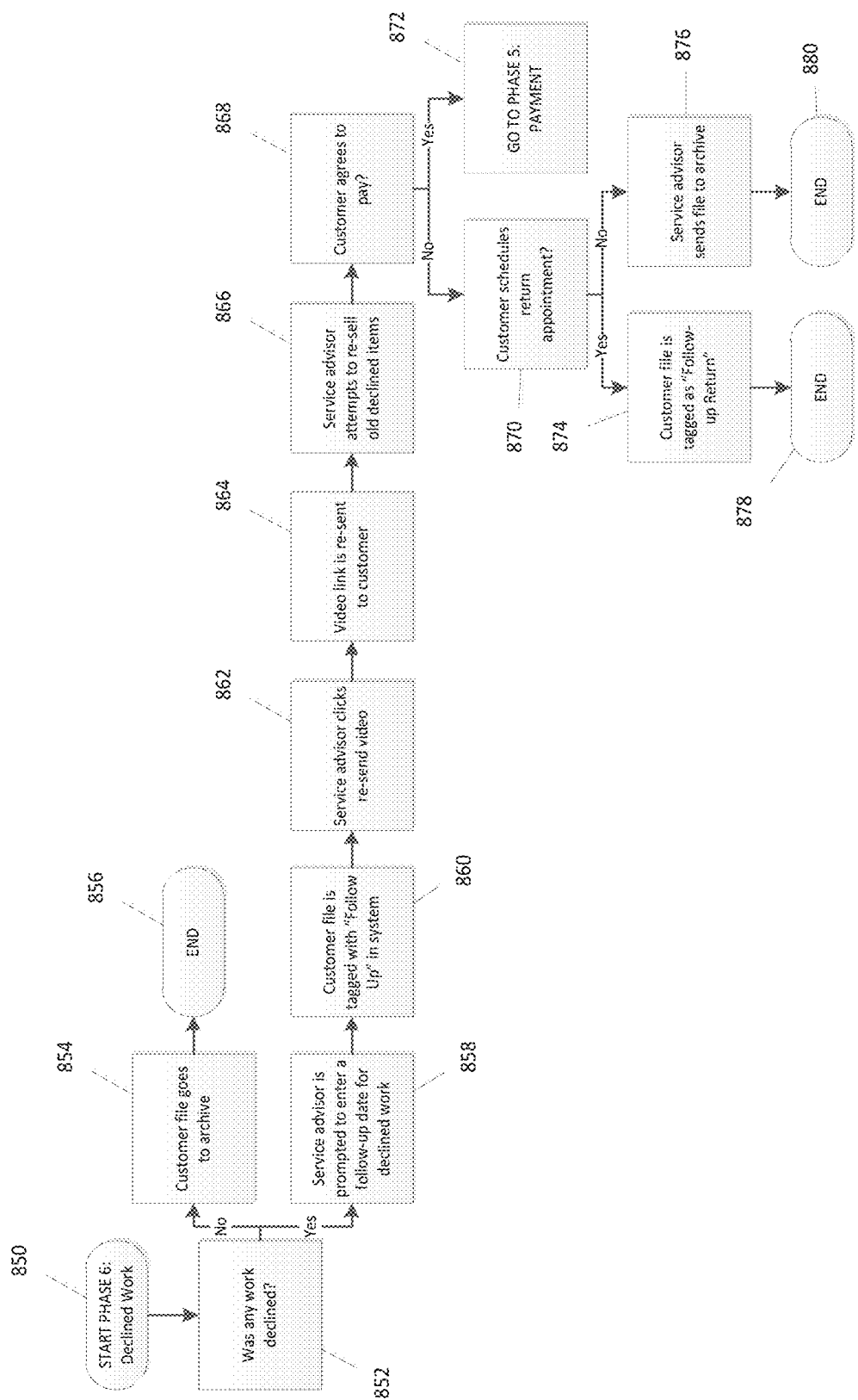
FIG. 15 is a schematic diagram of an illustrative embodiment of a sixth phase of a customer and an automotive service shop interacting with an automotive service system platform.

The automotive service system proceeds to Phase 6 of the workflow, which is shown schematically in FIG. 15. Phase 6 is a "declined work" phase 850. First, in step 852, the automotive service system determines whether any work was declined. If no work was declined, the automotive service system moves on to step 854 and the customer file is sent to an archive, and the phase ends at 856. However, if work was declined, the automotive service system moves instead to step 858, in which the service advisor is prompted to enter a follow-up date for declined work. Next, in step 860, the customer file is tagged with "Follow Up" in the automotive service system. Next, in step 862, the advisor clicks "re-send video," and the video link is re-sent to the customer in step 864. In step 866, the advisor attempts to re-sell old declined items to the customer. In step 868, the automotive service system checks if the customer agrees to pay. If yes, the automotive service system proceeds back to phase 5, payment in step 872. If the customer does not agree to pay, the automotive service system moves to step 870 and asks if the customer is willing to schedule a return appointment. If not, the automotive service system proceeds to step 876 and the service advisor sends the customer's file to the archive, and the phase ends at step 880. If the customer is willing to schedule a return appointment, the automotive service system moves instead to step 874, and the customer file is tagged as "Follow-Up Return." The phase then ends at step 878.

Illustrative Embodiment of a Web-Based Application

According to one aspect, an automotive service system may be embodied in an application that users (e.g. customers and personnel at an automotive service shop) can interact with. The application may be a web-based application, a desktop application (which includes tablet and smartphone applications), or any other suitable application that may be executed by a computing device. As used herein, the term "desktop application" is not limited to applications that run on a desktop computer. Instead, the term "desktop application" is meant to include all application that are run locally on a computing device rather than via a browser. Examples of desktop applications include software that is installed on a desktop or laptop computer, software that is stored on a removable storage device and run on the desktop or laptop computer, or smartphone/tablet/smartwatch apps such as iOS and Android apps.

One illustrative embodiment of a web-based application of the automotive service system is shown in FIGS. 16-22. It should be appreciated that all of the features shown in the web-based application could also be implemented in a desktop application. The web-based application of the automotive service system may employ a service approval module 400 and payment module 500 discussed above to perform the functions below, at least in part.

According to one aspect, interaction between an automotive service shop and a customer may begin with an introductory message (e.g. email or text message) sent to the customer. Personnel at an automotive service shop, such as a service advisor, may send the introductory message to the customer, or the automotive service system may automatically send the introductory message to the customer upon initiation of a new process, either by the automotive service shop, or by the customer.

Figure 16:
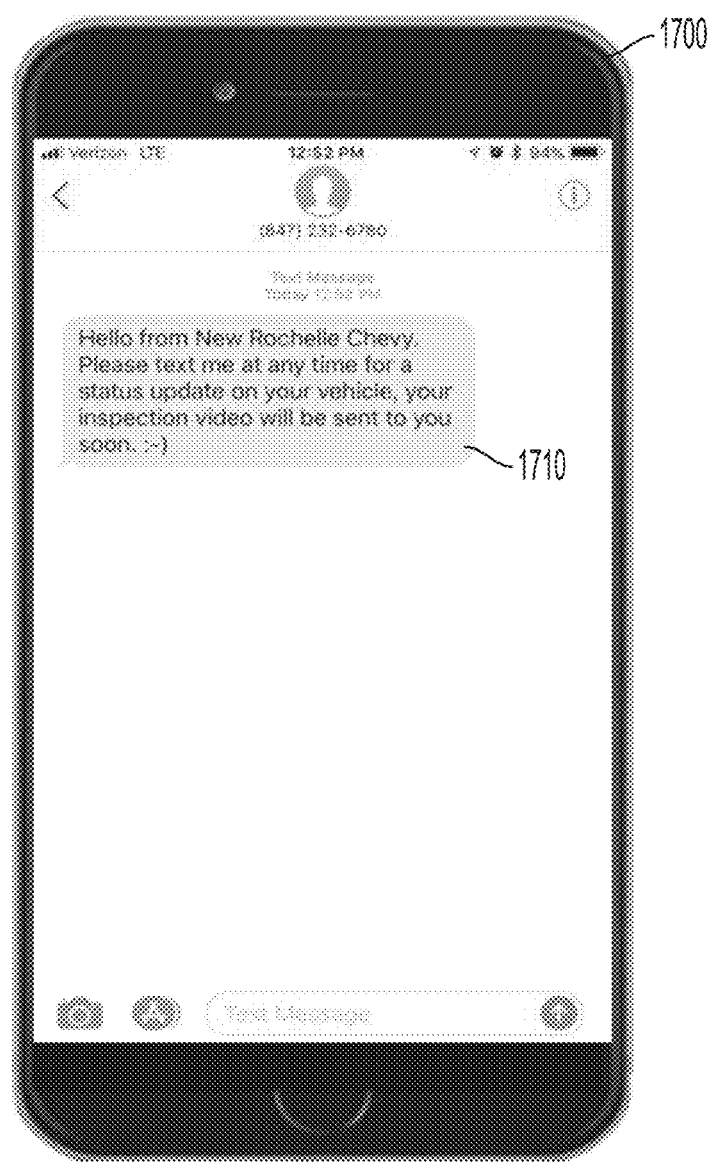
FIG. 16 depicts a screen shot of a welcome text sent to a customer's computing device via an automotive service system.

As shown in the screenshot in FIG. 16, in one illustrative embodiment, a customer's terminal, in this case a smartphone 1700, receives an introductory message 1710 that initiates two-way communication between the customer and the automotive service shop. The text message may have been automatically sent by the automotive service system after a service advisor at the automotive service shop open a new repair order for the customer. The customer receiving introductory message may receive it as a text message, e.g. SMS or MMS via the computing device's 1700 typical portal for receiving text messages. On the side of the automotive service shop, the two-way communication with the customer may be part of an application running on a terminal at the automotive service shop. In other embodiments, however, the automotive service shop may have simply sent the introductory message to the customer via a typical text messaging arrangement, e.g., via a phone.

Figure 17:
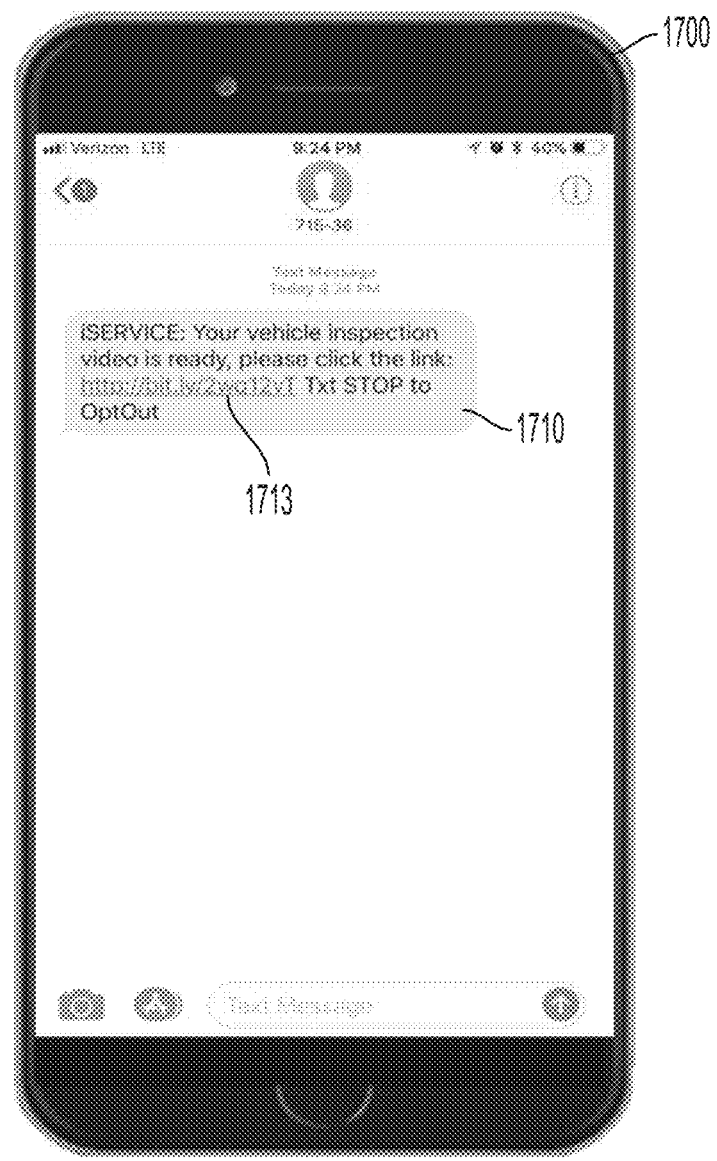
FIG. 17 depicts a screen shot of a text sent to a customer's computing device containing a link to access an inspection video via an automotive service system.

As shown in the screenshot in FIG. 17, when the vehicle inspection video has been prepared by the automotive service shop technician and is ready for access by the customer, the customer receives at text message 1712 with a link 1713 to access the video. In some embodiments, selecting the link 1713 will automatically bring the customer to an application, such as a web-based application or a desktop application. In other embodiments, the link may bring the customer to a third-party site where the video has been uploaded to, such as YouTube. In other embodiments, clicking on the link may initiate a video conference call between the customer and the technician, e.g. FaceTime or Skype, where the video is a live call with the technician performing a demonstration of the various components of the customer's vehicle and giving a recommendation for one or more automotive services.

Figure 18:
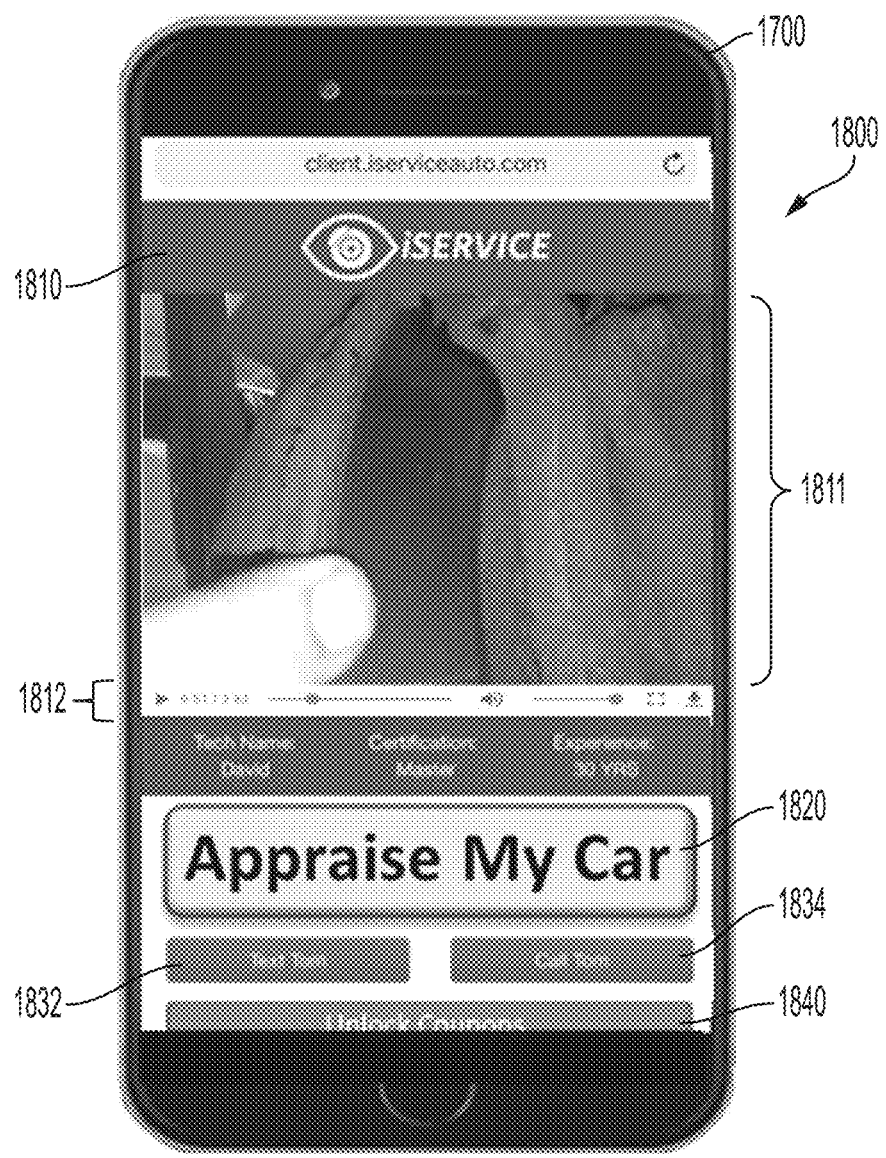
FIG. 18 depicts a screen shot of a web-based application that includes a video player for playing the inspection video, as well as an appraisal button.

In the illustrative embodiment shown in FIGS. 17 and 18, clicking on the link 1713 automatically opens up a web-based application 1800 in the computing device 1700's browser. A screenshot of the application 1800 is shown in FIG. 18. In the illustrative embodiment shown in FIG. 18, the application 1800 includes a video screen 1810 with a video player 1811 having controls 1812 to allow the customer to view the inspection video created by the technician. The controls 1812 may allow a customer to play the video, pause the video, jump to a specific place in the video, change the audio volume, enlarge the video, and download the video for offline viewing. The video can be replayed multiple times. In some embodiments, the automotive service system tracks when and how many times the video has been viewed, whether the entire video has been played, etc. Such information may be sent to the automotive service shop.

In some embodiments, the application 1800 may include technician details 1820 including information about the technician who created the inspection video. Example details include the technician's name, any certifications the technician may have, and the number of years of experience of the technician.

In some embodiments, the application 1800 may include contact buttons 1832, 1834 that allow the customer to contact the service advisor assigned to their repair order. The application 1800 may include a button 1832 to text the service advisor and a button 1834 to call the service advisor.

In some embodiments, the application 1800 may include an appraisal button 1820 that takes the customer to an appraisal module as previously described. Particularly after seeing the issues with the customer's vehicle and recommended services from the inspection video, the customer may wish to sell their vehicle rather than make the repairs, or at least determine what the value of their vehicle is to better decide whether or not to proceed with repairs.

In some embodiments, the application 1800 may include a coupon button 1840 that allows a customer to unlock or input coupons. Examples of how a customer may unlock coupons include, but are not limited to: supplying referral information, signing up for a customer appreciation program, entering membership information such as AAA membership, etc.

Figure 19:
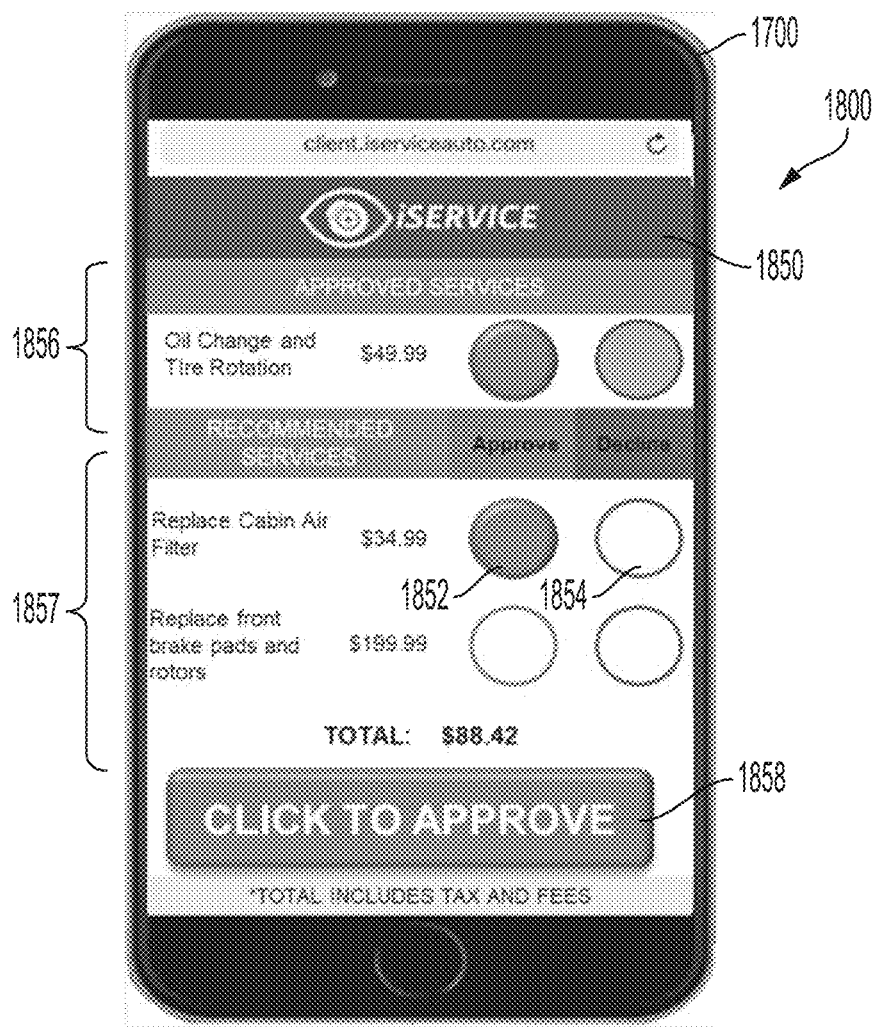
FIG. 19 depicts a screen shot of the web-based application including a listing of recommended services and an option for a customer to approve or decline the services.

In the illustrative embodiment shown in FIG. 19, the application 1800 includes a service approval screen 1850. This screen may appear automatically after the customer has finished watching the inspection video, or may appear when the customer selects a button such as an "order services" or "view recommended services" button. The service approval screen may include a list of recommended services, a short description of each service, along with a cost estimate for the service. Each service may have an "approve" 1852 or "decline" 1854 selection that a customer can choose. In some embodiments, the service approval screen may be divided into two sections: an "Approved Services" section 1856 and a "Recommended Services" section 1857. Prior to approval of any services, all services may appear in the "Recommended Services" section 1857. When a customer clicks "approve" on a service, the service moves from the "Recommended Services" section 1857 to the "Approved Services" section 1856. The "Approved Services" section 1856 may remain hidden until the customer has approved a service. The service approval screen may include a submit button 1858 that allows the customer to submit the approved and declined services.

Figure 20:
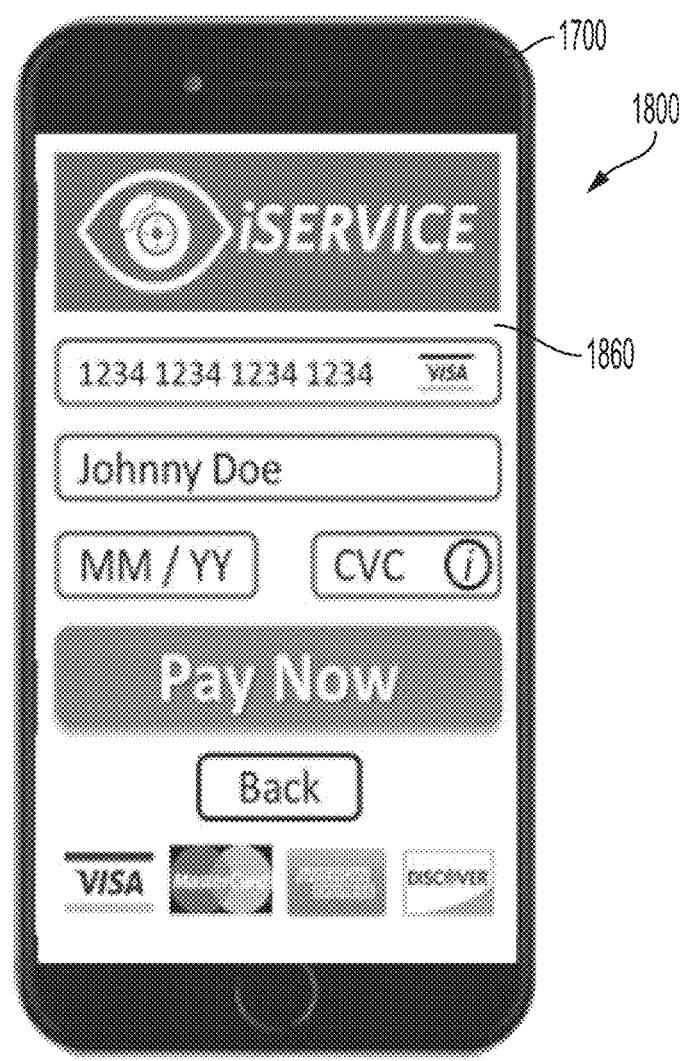
FIG. 20 depicts a screen shot of the web-based application including a payment information screen.

In the illustrative embodiment shown in FIG. 20, the application 1800 includes a payment screen 1860. The payment screen may include fields for completion by the customer. For example, the payment screen may ask the customer to enter credit card information.

Figure 21:
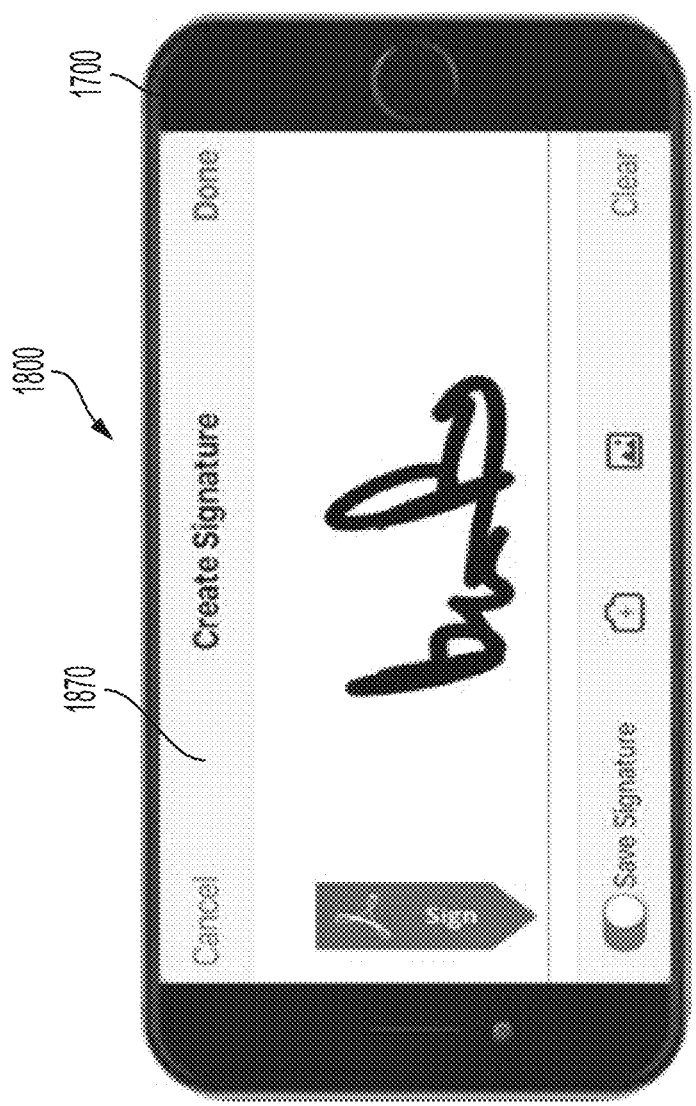
FIG. 21 depicts a screen shot of the web-based application including a signature screen.

In some embodiments, such as in the illustrative embodiment shown in FIG. 21, the application 1800 may include a signature screen 1870. A customer may use a finger or a stylus to sign the screen, or the customer may take a picture of his/her signature to serve as authorization. The customer may also choose to save their signature for future use.

Figure 22:
FIG. 22 depicts a screen shot of a web-based application including a financing button according to an alternative embodiment.

In some embodiments, such as in the illustrative embodiment shown in FIG. 22, the application 1800 may include one or more screens with a financing button 1880. A customer may click on this button to enter a financing module. In some embodiments, the financing button 1880 may appear on the same screen as the inspection video. In some embodiments, the financing button may appear on the same screen as the payment screen.

Figure 23:
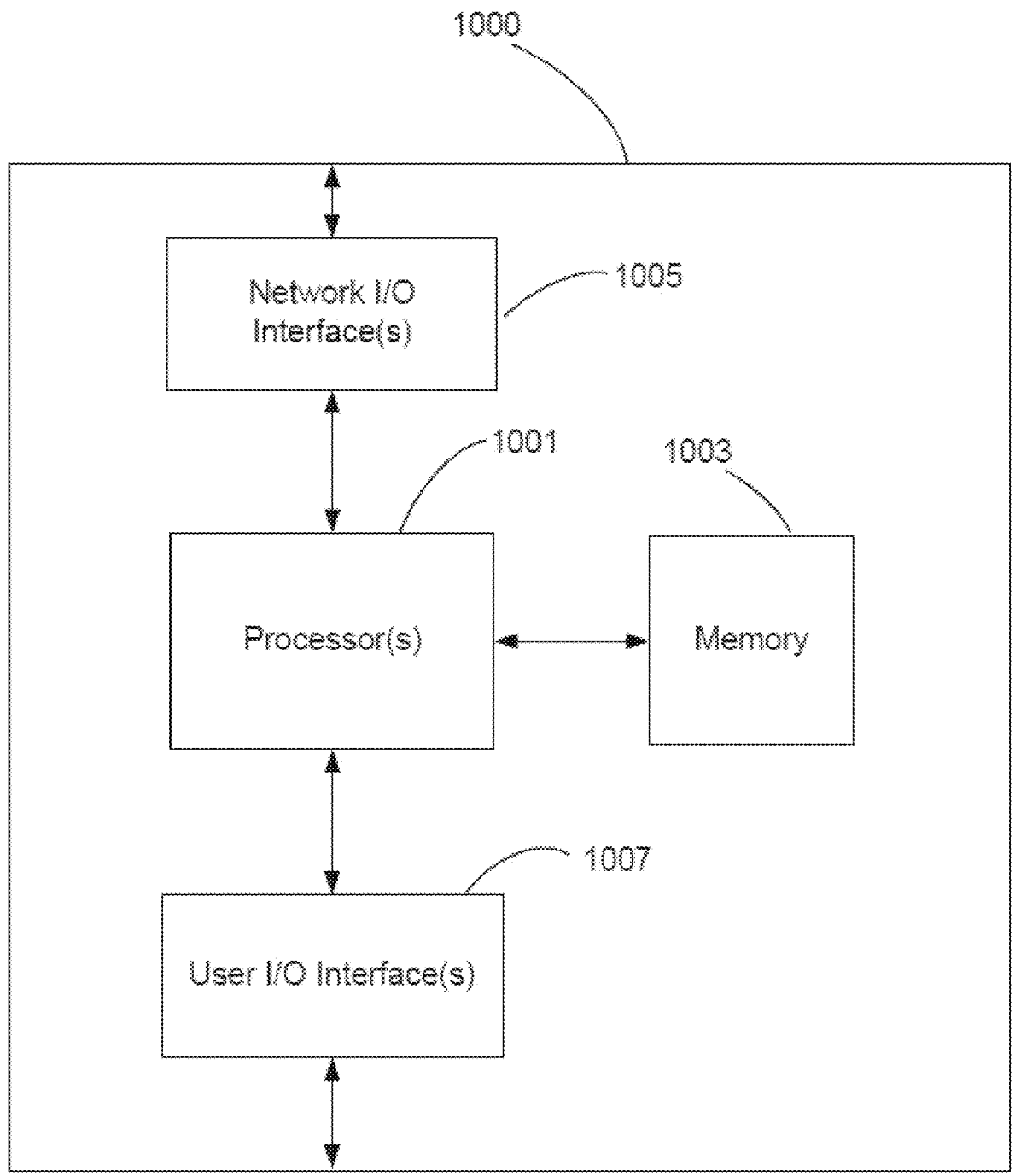
FIG. 23 is a block diagram of an illustrative computing device that may be used to implement a method of an automotive service system.

FIG. 23 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In some embodiments, a combination of programmable hardware and dedicated hardware may also be used.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method of providing automotive repair services to a customer, the method comprising:
    initiating a two-way text messaging communication between a customer and an automotive repair shop;
    sending the customer, via the two-way text messaging communication, access to a video including a demonstration in which one or more components of a customer vehicle are shown and a recommendation for an automotive service involving the one or more components is given, wherein the video is displayed via an automotive service system application;
    sending the customer, via the automotive service system application, a recommended automotive service and a cost estimate for the recommended automotive service;
    receiving approval of the recommended automotive service from the customer via the automotive service system application;
    sending the customer, via the automotive service system application, a financing option for the recommended automotive service; and
    receiving approval of the financing option from the customer via the automotive service system application.

2. The computer-implemented method of claim 1, wherein the step of sending the customer access to the video comprises a server communicating with a customer's communication device.

3. The computer-implemented method of claim 1, further comprising receiving payment for the recommended automotive service.

4. The computer-implemented method of claim 1, further comprising receiving, via a network, confirmation that the video has been accessed by the customer.

5. The computer-implemented method of claim 1, further comprising:
    sending the customer an offer to appraise the customer vehicle;
    receiving an acceptance of the offer by the customer; and
    notifying a sales department that the customer is potentially interested in selling the customer vehicle.

6. The computer-implemented method of claim 1, further comprising:
    sending a customer a vehicle self-diagnosis process comprising a plurality of questions relating to characteristics of the customer vehicle to identify an issue with the customer vehicle;
    receiving answers to the plurality of questions from the customer;
    based on the answers from the customer, determining one or more issues with the customer vehicle; and
    sending the customer an identification of the one or more issues with the customer vehicle.

7. The computer-implemented method of claim 6, further comprising:
    determining, based on the one or more issues with the customer vehicle, a proposed automotive service for addressing the one or more issues with the customer vehicle;
    sending a request for quotes for the proposed automotive service to a plurality of automotive repair shops;
    receiving, from each of the plurality of automotive repair shops, a quote for the proposed automotive service;
    sending each of the quotes to the customer; and
    receiving approval of one of the quotes from the customer.

8. The computer-implemented method of claim 1, further comprising:
   sending a request for quotes for an automotive service to a plurality of automotive repair shops;
   receiving, from each of the plurality of automotive repair shops, a quote for the automotive service;
   sending each of the quotes to the customer; and
   receiving approval of one of the quotes from the customer.

9. The computer-implemented method of claim 1, wherein the step of sending the customer access to the video comprises sending the customer an SMS or MMS containing a link to the video.

10. The computer-implemented method of claim 1, wherein the step of sending the customer access to the video comprises sending the customer a link to a web-based application platform that displays the video and displays the recommended automotive service and the cost estimate for the recommended automotive service.

11. A computer system, comprising:
   a server computer including one or more processors that are configured to:
   initiate a two-way text messaging communication between a customer and an automotive repair shop;
   send the customer, via the two-way text messaging communication, access to a video including a demonstration in which one or more components of a customer vehicle are shown and a recommendation for an automotive service involving the one or more components is given, wherein the video is displayed via an automotive service system application;
   send the customer, via the automotive service system application, a recommended automotive service and a cost estimate for the recommended automotive service;
   receive approval of the recommended automotive service from the customer via the automotive service system application;
   send the customer, via the automotive service system application, a financing option for the recommended automotive service; and
   receive approval of the financing option from the customer via the automotive service system application.

12. The computer system of claim 11, wherein the one or more processors are further configured to receive payment for the recommended automotive service.

13. The computer system of claim 11, wherein the one or more processors are further configured to receive confirmation that the video has been accessed by the customer.

14. The computer system of claim 11, wherein the one or more processors are further configured to:
   send the customer an offer to appraise the customer vehicle;
   receive an acceptance of the offer by the customer; and
   notify a sales department that the customer is potentially interested in selling the customer vehicle.

15. The computer system of claim 11, wherein the one or more processors are further configured to:
   send a customer a vehicle self-diagnosis process comprising a plurality of questions relating to characteristics of the customer vehicle to identify an issue with the customer vehicle;
   receive answers to the plurality of questions from the customer;
   based on the answers from the customer, determine one or more issues with the customer vehicle; and
   send the customer an identification of the one or more issues with the customer vehicle.

16. The computer system of claim 15, wherein the one or more processors are further configured to:
   determine, based on the one or more issues with the customer vehicle, a proposed automotive service for addressing the one or more issues with the customer vehicle;
   send a request for quotes for the proposed automotive service to a plurality of automotive repair shops;
   receive, from each of the plurality of automotive repair shops, a quote for the proposed automotive service;
   send each of the quotes to the customer; and
   receive approval of one of the quotes from the customer.

17. The computer system of claim 11, wherein the one or more processors are further configured to:
   send a request for quotes for an automotive service to a plurality of automotive repair shops;
   receive, from each of the plurality of automotive repair shops, a quote for the automotive service;
   send each of the quotes to the customer; and
   receive approval of one of the quotes from the customer.

18. A computer-implemented method of providing automotive repair services to a customer, the method comprising:
   initiating a two-way text messaging communication between a customer and an automotive repair shop;
   sending the customer, via the two-way text messaging communication, access to an automotive service system application;
   sending the customer, via the automotive service system application, a recommended automotive service and a cost estimate for the recommended automotive service;
   sending the customer, via the automotive service system application, an offer to appraise a customer vehicle;
   receiving an acceptance of the offer by the customer via the automotive service system application; and
   notifying a sales department of the acceptance of the offer.

* * * * *